US011252048B2

(12) United States Patent
Mladin et al.

(10) Patent No.: US 11,252,048 B2
(45) Date of Patent: Feb. 15, 2022

(54) CAPABILITY EXPOSURE FOR SERVICE INSTANTIATION

(71) Applicant: CONVIDA WIRELESS, LLC, Wilmington, DE (US)

(72) Inventors: Catalina Mihaela Mladin, Hatboro, PA (US); Michael F. Starsinic, Newtown, PA (US); Hongkun Li, Malvern, PA (US); Rocco Di Girolamo, Laval (CA)

(73) Assignee: Convida Wireless, LLC, Wilmington, DE (US)

( * ) Notice: Subject to any disclaimer, the term of this patent is extended or adjusted under 35 U.S.C. 154(b) by 49 days.

(21) Appl. No.: 16/339,443

(22) PCT Filed: Oct. 5, 2017

(86) PCT No.: PCT/US2017/055270
§ 371 (c)(1),
(2) Date: Apr. 4, 2019

(87) PCT Pub. No.: WO2018/067780
PCT Pub. Date: Apr. 12, 2018

(65) Prior Publication Data
US 2019/0238425 A1 Aug. 1, 2019

Related U.S. Application Data

(60) Provisional application No. 62/404,467, filed on Oct. 5, 2016.

(51) Int. Cl.
*H04L 12/24* (2006.01)
(52) U.S. Cl.
CPC ...... *H04L 41/5048* (2013.01); *H04L 41/0806* (2013.01); *H04L 41/0813* (2013.01); *H04L 41/0883* (2013.01); *H04L 41/12* (2013.01)

(58) Field of Classification Search
CPC ............. H04L 41/5048; H04L 41/0806; H04L 41/0813; H04L 41/0883; H04L 41/12
See application file for complete search history.

(56) References Cited

U.S. PATENT DOCUMENTS

2013/0304616 A1* 11/2013 Raleigh ................. G06Q 40/12
705/34
2017/0006083 A1* 1/2017 McDonnell ......... H04L 67/1097
(Continued)

FOREIGN PATENT DOCUMENTS

| CN | 105429806 A | 3/2016 |
| WO | 2016/048430 A1 | 3/2016 |
| WO | 2016/128030 A1 | 8/2016 |

OTHER PUBLICATIONS

European Telecommunications Standards Institute (ETSI), Network Functions Virtualisation (NFV); Management and Orchestration, ETSI GS NFV-MAN 001 V1.1.1, Dec. 2014 (Year: 2014).*
(Continued)

*Primary Examiner* — Wing F Chan
*Assistant Examiner* — Billy H Ng
(74) *Attorney, Agent, or Firm* — BakerHostetler

(57) ABSTRACT

The application is at least directed to a core network including a non-transitory memory having instructions stored thereon for registering a network function or network function template in the core network. The network includes a processor, operably coupled to the non-transitory memory. The processor is configured to perform the instruction of determining that registration of the network function or network function template is acceptable. The processor is also configured to perform the instruction of transmitting a message including the network function or network function template to a repository in the core network. The processor is also configured to perform the instruction of verifying the network function or network function template against exist-
(Continued)

ing policies in the core network. The processor is also configured to perform the instruction of registering the network function or network function template in the repository after verification. The application is also directed to a core network that discovers a network function or network function template therein. The application is also directed to a core network that instantiates a network function.

19 Claims, 25 Drawing Sheets

(56) References Cited

U.S. PATENT DOCUMENTS

| | | | |
|---|---|---|---|
| 2017/0012968 A1* | 1/2017 | Feng | G06F 8/63 |
| 2017/0250892 A1* | 8/2017 | Cooper | G06F 21/552 |
| 2017/0373939 A1* | 12/2017 | Liu | G06F 16/951 |
| 2019/0149408 A1* | 5/2019 | Li | H04L 12/4641 709/223 |
| 2019/0253264 A1* | 8/2019 | Singaravelu | H04L 9/3263 |

OTHER PUBLICATIONS

"Network Functions Virtualisation (NFV); Virtual Network Functions Architecture", Draft ETSI GS NFV-SWA 001 V0.2.4, Nov. 2014, 92 pages.

3GPP TR 23.718 V1.1.0, "3rd Generation Partnership Project; Technical Specification Group Services and System Aspects; Architecture Enhancement for Flexible Mobile Service Steering (Release 13)", Jul. 2015, 38 pages.

3GPP TR 23.799 V1.0.2, "3rd Generation Partnership Project; Technical Specification Group Services and System Aspects; Study on Architecture for Next Generation System (Release 14)", Sep. 2016, 423 pages.

3GPP TS 23.682 V13.4.0, "3rd Generation Partnership Project; Technical Specification Group Services and System Aspects; Architecture Enhancements to Facilitate Communications with Packet Data Networks and Applications (Release 13)", Dec. 2015, 81 pages.

3GPP TSG SA Meeting #66 TD SP-140703, Updated WID for Flexible Mobile Service Steering (FMSS), Dec. 2014, 6 pages.

3GPP TSG SA WG2 Meeting #115 S2-163207, Huawei, HiSilicon, "Solution: The Discover of NFs", May 2016, 6 pages.

ETSI GS NFV 002 v1.1.1 Group Specification, "Network Functions Virtualisation (NFV); Architectural Framework", Oct. 2013, 21 pages.

ETSI GS NFV-IFA 011 v2.1.1 Group Specification, "Network Functions Virtualisation (NVF); Management and Orchestration; NVF Packaging Specification" Oct. 2016, 53 pages.

ETSI GS NFV-IFA 014 V2.1.1, "Network Functions Virtualisation (NFV); Management and Orchestration; Network Service Templates Specification" Oct. 2016, 35 pages.

ETSI GS NFV-MAN 001 V0.5.0 "Network Function Virtualization (NFV) Management and Orchestration", May 2014, 193 pages.

Halpern, et al., "Internet Engineering Task Force (IETF) RFC: 7665, "Service Function Chaining (SFC) Architecture, Oct. 2015, 32 pages.

Quinn, et al., Service Function Chaining Internet Draft, "Network Service Header draft-ietf-sfc-nsh-07.txt", Aug. 2016, 37 pages.

SA WG@ Temporary Document SA WG2 Meeting #114 S2-162259, NTT Docomo, "Update of Solution for Support of Multiple Connections to Multiple Network Slices", Apr. 2016, 7 pages.

* cited by examiner

CAPABILITY EXPOSURE FOR SERVICE INSTANTIATION

CROSS-REFERENCE TO RELATED APPLICATIONS

This application is the National Stage Application of International Patent Application No. PCT/US2017/055270 filed Oct. 5, 2017 which claims the benefit of priority of U.S. Provisional Application No. 62/404,467, filed Oct. 5, 2016, entitled "Capability Exposure for Service Instantiation," the content of which is hereby incorporated by reference in its entirety.

FIELD

The present application is directed to network function virtualization techniques and instructions on a core network for registration, discovery, instantiation, scaling and reconfiguration of services.

BACKGROUND

Generally, network operators in a core network may decide to instantiate new services or network functions (NFs) based on observed network behavior. For example, network behavior may suggest that more or fewer devices are attached to the network. As a result, the network operator may decide to scale up or scale down a particular NF.

Aggregating the necessary intelligence to scale up or scale down may require further assistance. Specifically, a node such as user equipment (UE) and/or an application server (AS) may be better positioned to offer suggestions to scale, configure, or instantiate network functions. For example, an AS may inform the network operator that a certain type of traffic is cacheable resulting in the network operator knowing it is acceptable to instantiate a caching service network function.

The network operator may offer a catalog or repository of a NF available for instantiation upon request by a node. A request from the node to configure, scale or instantiate a NF may not always result in an instantaneous network reconfiguration. Depending upon the request, it may take several minutes or longer for network reconfiguration to complete. What is needed is an improved way to notify nodes when network reconfiguration has occurred.

The network confirmation may also relate to where the services or NFs are instantiated. That is, there are instances when a NF may need to be geographically located at the edge of the network in close proximity to devices that use it. However, instantiating services at the edge of the network poses challenges with respect to collecting charging records on services provided locally for the UE.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to network function virtualization including dynamic registration, discovery, instantiation, scaling and reconfiguration of services.

In one aspect of the application, a core network is described that includes a non-transitory memory having instructions stored thereon for registering a network function or network function template in the core network. The core network also includes a processor, operably coupled to the non-transitory memory. The processor is configured to perform the instruction of determining that registration of the network function or network function template is acceptable. The processor is also configured to perform the instruction of transmitting a message including the network function or network function template to a repository in the core network. The processor is also configured to perform the instruction of verifying the network function or network function template against existing policies in the core network. The processor is also configured to perform the instruction of registering the network function or network function template in the repository after verification.

In another aspect of the application, a core network is described that includes a non-transitory memory having instructions stored thereon for discovering a network function or network function template in the core network. The core network also includes a processor operably coupled to the non-transitory memory. The processor is configured to perform the instruction of determining, at the core network, that discovery of the network function or network function template is acceptable. The processor is also configured to perform the instruction of transmitting, a message including the network function or network function template to a repository in the core network. The processor is also configured to perform the instruction of searching, in the core network, for the network function or the network function template in the repository. The processor is further configured to perform the instruction of discovering, in the core network, the network function or network function template in the repository. The processor is even further configured to perform the instruction of sending a discovery response based upon the discovering instruction to a networking function in the core network.

Yet another aspect of the application is directed to a core network including a non-transitory memory having instructions stored thereon for instantiating a network function in the core network. The core network also includes a processor that is operably coupled to the non-transitory memory. The processor is configured to perform the instruction of determining, at the core network, that instantiation of the network function is acceptable. The processor is also configured to perform the instruction of determining that instantiation of the network function is acceptable. The processor is also configured to perform the instruction of transmitting a message including the instantiation request for the network function to a slice instance management function in the core network. The processor is also configured to perform the instruction of verifying the network function can be instantiated. The processor is also configured to perform the instruction of instantiating the network function. The instantiation instruction may include a registration of a first instance of the network function. Alternatively, if the network function exists, the instantiation instruction may include a change of state.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1:
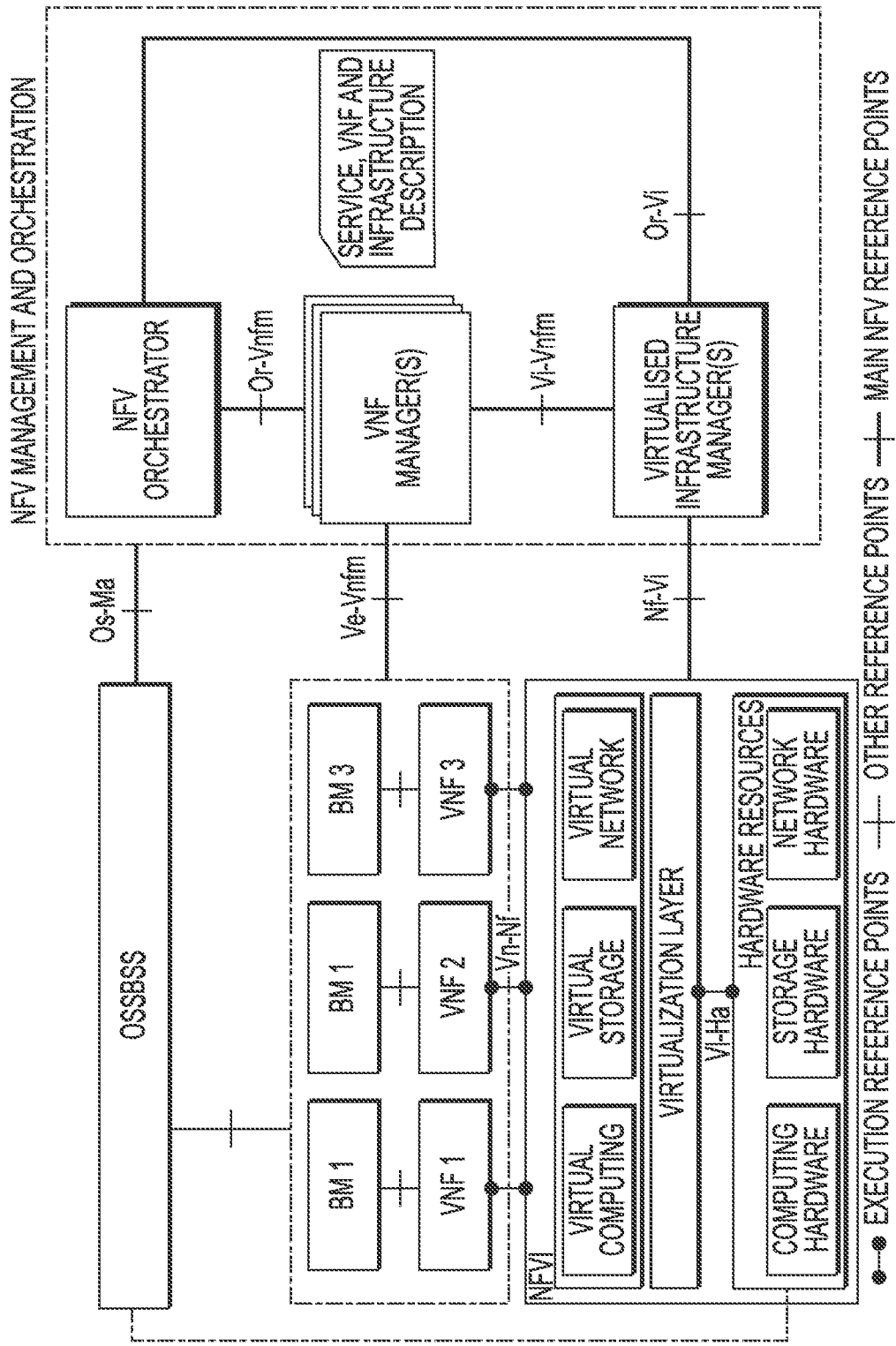
FIG. 1 illustrates a European Telecommunications Standardization Institute (ETSI) network function virtualization (NFV) architectural framework.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

Generally, the application is directed to core networks leveraging network function virtualization (NFV) techniques to enable dynamic instantiation, scaling and reconfiguration of the services. Network operators will require information or actions from the UEs and ASs to trigger and/or provide information to be used by the decisions and procedures for service instantiation. In an embodiment, the application describes NF repositories, a catalog or repository, and NF templates in the core network. Since the network function templates provide a common profile of the associated NF instantiations, the NF Templates (NFTs) may also be termed NF profiles. It should also be appreciated that, if no independent repository for NFTs is deployed, then the functionality that is described as being part of the NFT may be performed by the NF Repository (NFR), integrated with the NFR, or co-located with the NFR. The NFR could also be referred to as the NF Repository Function (NRF).

Third-party SCSs or ASs may be enabled to access the repository of NFs available in the mobile core network. This allows them to discover existing functions and obtain relevant information about their services.

In an aspect of the application, methods and systems are drawn to enable the SCS/AS to register NFs and NFTs at their respective repositories. This provides new functions for further use in the core network.

In another aspect of the application, methods and systems are drawn to enable the SCS/AS to discover NFs, NFTs, and their capabilities, in their respective repositories.

In yet another aspect of the application, methods and systems are drawn to enable the SCS/AS to subscribe to the NF and NFT repositories for notifications of updates and events.

In yet even another embodiment, methods and systems are drawn to enable ASs to request the instantiation, i.e., spawning, of NFs available in the system. The instantiation allows the node to request specific geographic locations for function instantiation. It also provides capabilities for configuring how charging information should be generated. Several methods are envisaged in this application including but not limited to: (i) enabling the SCS/AS to request instantiations of NFs in the core network, (ii) enabling the SCS/AS to reconfigure an instantiated NF, (iii) enabling the SCS/AS to terminate an NF instance, (iv) enabling the SCS/AS to scale up/down the NF, and (v) enabling the SCS/AS to change states of a NF instantiation. These instantiation and instance management and reconfiguration techniques provide capabilities to request specific locations, e.g., geographic, for function instantiation. They also provide capabilities for configuring how charging information should be generated. As will be discussed in more detail below, the techniques of this application are applicable to an operator-owned AS, SCS, Service, Network Function, Value Added Service, Core Function, or Value Added Functions. Similar but separate methods for enabling UEs to discover this functionality are also envisaged in this application.

Definitions and Acronyms

Provided below are definitions for terms and phrases commonly used in this application in TABLE 1.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a common service entity (CSE) or service capability layer (SCL). A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

TABLE 1

| Acronym | Phrase |
| --- | --- |
| 3GPP | 3$^{rd}$ Generation Partnership Program |
| API | Application Program Interface |
| AS | Application Server |
| BSS | Business Support System |
| CN | Core Network |
| EM | Element Management |
| EPC | Evolved Packet Core |
| EPS | Evolved Packet System |
| ETSI | European Telecommunications Standardization Institute |
| GGSN | Gateway GPRS Support Node |
| GPRS | General packet radio service |
| HLR | Home Location Register |
| HSS | Home Subscriber Server |
| IE | Information Element |
| IETF | Internet Engineering Task Force |
| IRF | Interconnection and Routing Function |
| LTE | Long Term Evolution |
| MANO | Management and Orchestration |
| MCN | Mobile Core Network |
| MNO | Mobile Network Operator |
| NAS | Non Access Stratum |
| NF | Network Function |
| NFT | Network Function Template |
| NFR | Network Function Repository |
| NFV | Network Function Virtualization |
| NRF | Network Function Repository Function |
| NSH | Network Services Header |
| OSS | Operations Support System |
| OTT | Over The Top |
| PCRF | Policy and Charging Rules Function |
| PDN | Packet Data Network |
| PLMN | Public Land Mobile Network |
| PMF | Policy Management Function |
| P-GW | PDN Gateway |

TABLE 1-continued

| Acronym | Phrase |
| --- | --- |
| QoS | Quality of Service |
| RAN | Radio Access Network |
| RIF | RAT Interface Function |
| SCF | Service Classification Function |
| SCS | Service Capability Server |
| SCEF | Service Capability Exposure Framework |
| SFC | Service Function Chaining |
| SFF | Service Function Forwarder |
| SGSN | Serving GPRS Support Node |
| S-GW | Serving Gateway |
| SIMF | Slice Instance Management Function |
| UE | User Equipment |
| VA | Value Add |
| VAS | Value Add Services |
| VNF | Virtualised Network Function |

Consumer NF is a function which needs to access the functionality of other NFs, therefore consuming their services NF is a processing function in a network which has defined functional behavior and interfaces. An NF can be implemented either as a network element on a dedicated hardware, or as a software instance running on a dedicated hardware, or as a virtualized function instantiated on an appropriate platform, e.g., on a cloud infrastructure. An NF may be the smallest unit that is instantiated in the network.

Network service (NS) is a service is functionality provided to the end user via instantiating one or more functions. The NS is defined as a composition of NFs.

Network slice or network slice instance is an instantiation of a network slice template. A network slice is composed of all the NFs and NSs that are required to provide the required telecommunication services and network capabilities, and the resources to run these NFs and NSs.

The Core-NF describes OAM NFs defined in the CN domain.

The VA-NFs (value-add NFs) are used for NFs provided in the tenant domain by OAM or other tenants.

The OTT-NFs (over-the-top-NFs) is used for network functions/services from external domains.

A provider is a NF whose functionality is provided for use to other NFs.

(S)Gi-LAN is a reference point that describes the point of logical interconnection between an EPC network and a different packet data network (PDN), while the Gi reference point describes the point of logical interconnect between a GPRS network and another PDN. The term (S)Gi-LAN refers to the packet data network that sits between the GGSN or P-GW of the Mobile Core network and the Internet. The (S)Gi-LAN is under control of the MNO.

The underlay network (ULN) is a group of NFs or nodes that reside in the core network but do not belong to any specific network slice (instance). Even though the ULN functions do not belong to a specific network slice, they may be virtualized and may be grouped together as a set of common (used by multiple network slice instances) functions. Functionality in the undelay network may be aligned with the functions described as common CP functions in reference.

Network Functions Virtualization (NFV)

NFV is a network architecture concept that uses virtualization to create network node functions as virtual building blocks that are connected to provide communication services. This aims to transform the way that network operators architect networks by consolidating many network equipment types onto industry standard high volume servers, switches and storage. NFs (e.g., mobility management, session management, QoS) are implemented in software that can run on standard server hardware. NFs may be instantiated at various locations such as data centers, network nodes and even end user premises.

The ETSI work group on NFV has produced white papers, standard terminology definitions and use cases that act as references for vendors and operators considering implementing NFV. An architectural framework for applying NFV concepts to the mobile core network is envisaged in this application.

The NFV architectural framework illustrated in FIG. 1 identifies functional blocks and the main reference points between such blocks. The functional blocks are:

Virtualized Network Function (VNF)
Element Management (EM)
NFV Infrastructure: Hardware and virtualized resources, and Virtualization Layer
Operations and Business Support Systems (OSS/BSS)
NFV Management and Orchestration (MANO) including:
Virtualized Infrastructure Manager(s), NFV Orchestrator, VNF Manager(s), Service, VNF and Infrastructure Description As specified by the ETSI architecture, VNFs can assume a number of internal states with transitions providing architectural patterns for expected VNF functionality. This is exemplarily shown in TABLE 2 below.

TABLE 2

| State | Description |
| --- | --- |
| Null | A VNF Instance does not exist and is about to be created |
| Instantiated Not Configured | VNF instance does exist but it is not configured for service |
| Instantiated Configured - Inactive | A VNF instance is configured for service |
| Instantiated Configured - Active | A VNF instance that participates in service |
| Terminated | A VNF instance that has ceased to exist |

Value Added Services

MNOs have a great deal of interest in optimizing complex services provided through the packet data network between the MCN and external networks via the 3GPP-defined (S)Gi interface.

These functions may include value added services (VAS) such as web proxy, video optimization, firewalls, load balancers, HTTP Header Enrichment functions, TCP optimizers, content and charging gateways and NATs. Generally, deep packet inspection (DPI) techniques determine if each VAS should operate on a data flow. (S)Gi-LAN functions are under control of the MNO and can be virtualized and mapped to software-configured service chains to create a more efficient and programmable value-added services domain.

Figure 2:
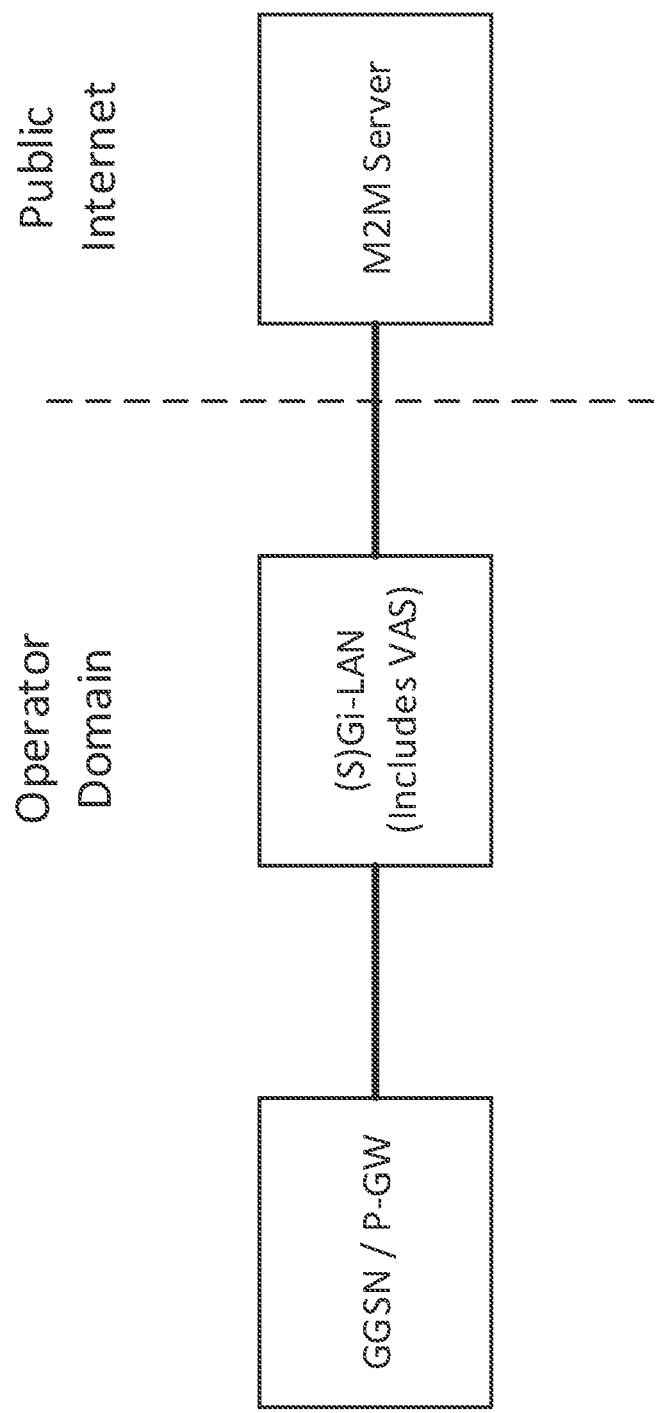
FIG. 2 illustrates an (S)Gi-LAN architecture.

As shown in FIG. 2, traffic may be routed to/from the (S)Gi-LAN and Servers in the public Internet such as an M2M Server. Moreover, the M2M server may be deployed inside the (S)Gi-LAN by the operator or service provider to provision a set of value added services for M2M/IoT use cases.

IETF Service Function Chaining

IETF has developed an architecture framework for efficiently deploying VASs otherwise known as "service functions" in this application. The framework allows traffic to be "steered" through just the services that apply to each individual flow rather than requiring that all traffic be serially routed through all service functions.

Figure 3:
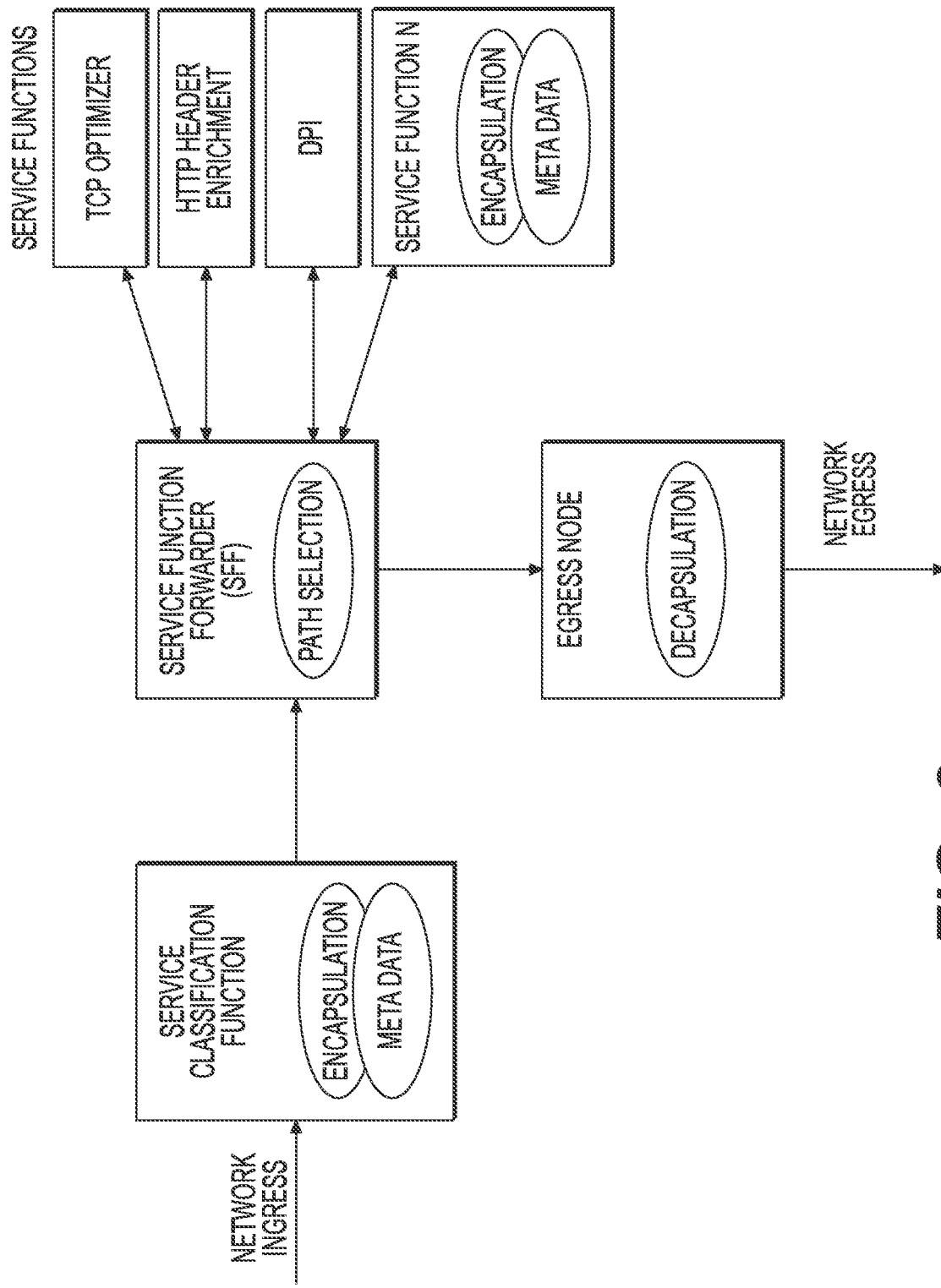
FIG. 3 illustrates an internet engineering task force (IETF) service function chaining architecture framework.

FIG. 3 illustrates a diagram of the main components of the IETF's SFC architecture framework. The service classification function (SCF) accepts input packets. In a traditional (S)Gi-LAN, input packets may be IP packets from the P-GW/GGSN or the Internet. For example, the SCF may encapsulate the input packets with another header; determine what service functions the packet should be routed through; determine the order that the packet should be routed through the service functions; and attach metadata to the packet to assist the service functions.

The service function forwarder (SFF) will accept packets from SCF and route them through the service functions. Once a packet has been routed through its service path, the SFF will forward the packet to an egress node. The egress node will remove any extra header information that was inserted by the SCF, SFF, or a service function and send the packet out of the (S)Gi-LAN and into the P-GW/GGSN or public Internet.

Figure 4:
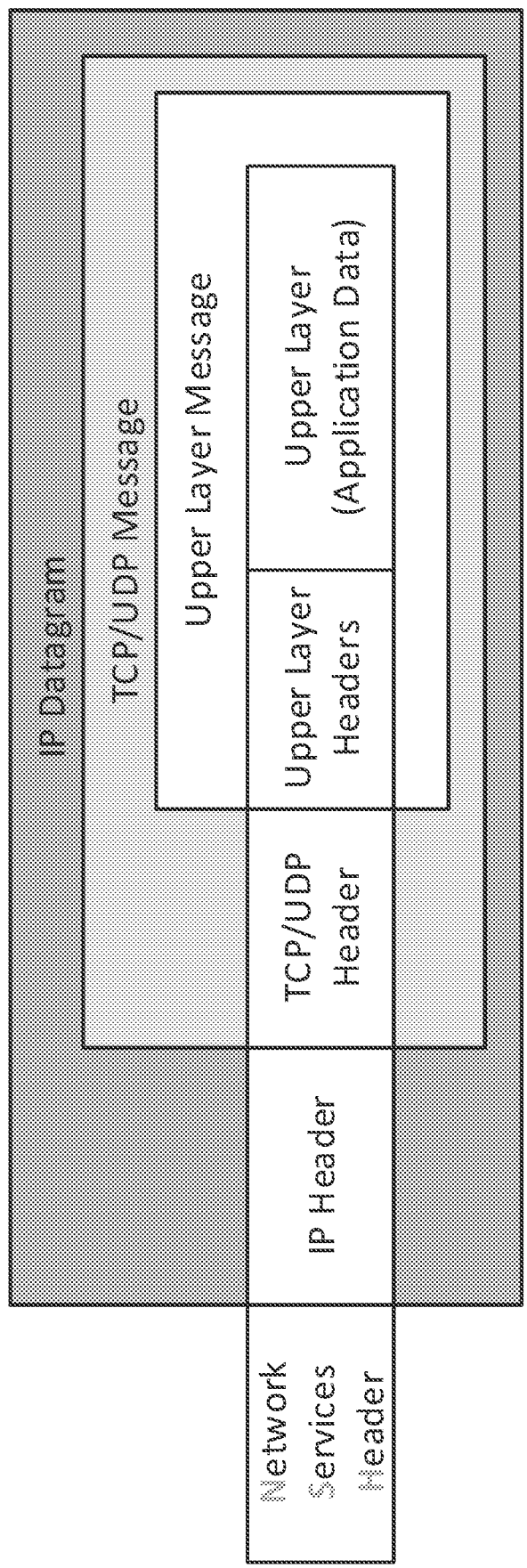
FIG. 4 illustrates a network service header (NSH) encapsulation relative to an internet protocol (IP) datagram.

IETF's SFC working group defined the network services header (NSH) to contain metadata and service path information used in the data plane to steer traffic through network services. FIG. 4 illustrates the NSH encapsulation relative to the IP datagram. The format of the NSH includes the following three headers:

In the first header, the base header includes: (i) A version field; (ii) A 'C' bit to indicate that critical metadata is present in the network services header; (iii) A length field to indicate the total length of the NSH; (iv) A meta data type field to indicate the format of the meta data; and (v) A next protocol field to indicate the format of the original payload.

In the second header, the service path header includes: (i) A service path ID which is a 24 bit field that indicates the service path that should be selected for the packet; and (ii) A service index that is used to indicate the packets location in the service path.

The third header depends on how the meta data type field is set in the base header. The context header can be in one of two formats—fixed length or contain variable length values. For the variable length option, the format of the metadata and how to indicate the length of each value in the context header are specified.

Service aware nodes are permitted to perform header related actions such as inserting the header, removing the header, selecting the service path, updating context headers, and policy selection based on the header contents. Of course, service aware nodes are also able to inspect as well as modify more than just the NSH header. Service nodes such as NATs, firewalls, HTTP header enrichment can inspect and modify the IP, UDP/TCP/application data as well.

3GPP Flexible Mobile Service Steering

The 3GPP SA2 working group has a work item called flexible mobile service steering (FMSS). The objective of this work item is to define service requirements to enable the 3GPP core network to define and modify traffic steering policies that will be used to select required service enablers of the operator-deployed (S)Gi-LAN. The aim is to realize efficient and flexible mobile service steering in the (S)Gi-LAN.

Figure 5:
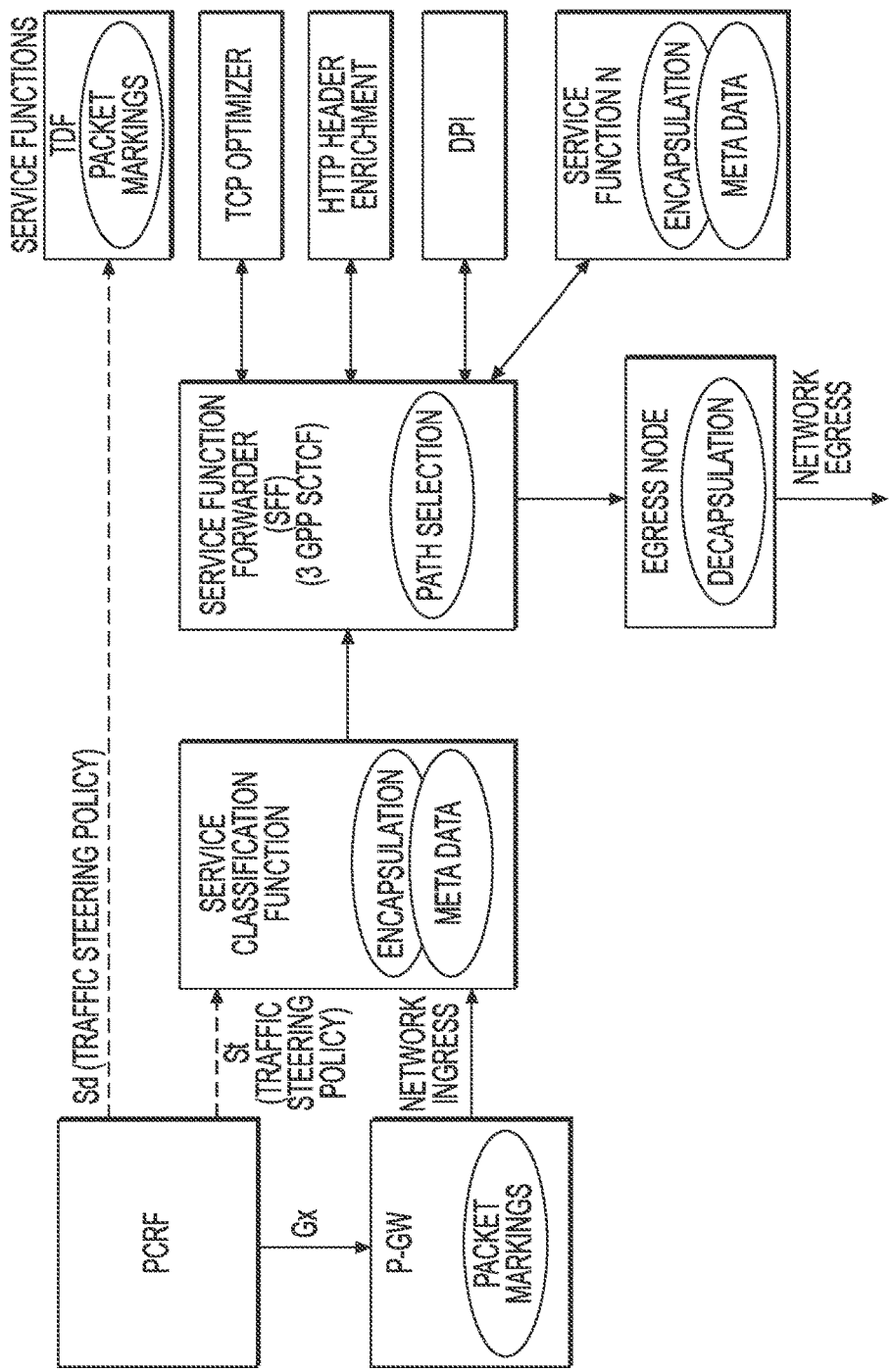
FIG. 5 illustrates a 3GPP flexible mobile service steering (FMSS) architecture and the network service descriptor (NSD).

FIG. 5 shows how the 3GPP architecture would be applied to the IETF-proposed architecture. The green shaded boxes are standardized by 3GPP and owned by the MNO. The Orange boxes are not standardized by 3GPP, but they are typically deployed in the (S)Gi-LAN and owned by the MNO.

A St reference point allows the PCRF to provide traffic steering policies to the SCF in the (S)Gi-LAN. The St reference point also proposes the Sd interface to communicate with the TDF to provide traffic steering policies to the TDF. The TDF may then be used to apply packet markings (i.e., an NSH) to the traffic based on the detected application, user, etc. and P-GW applies packet markings (i.e., an NSH) based on policies from the PCRF.

Network Function Templates and the Network Service Descriptor

Figure 6:
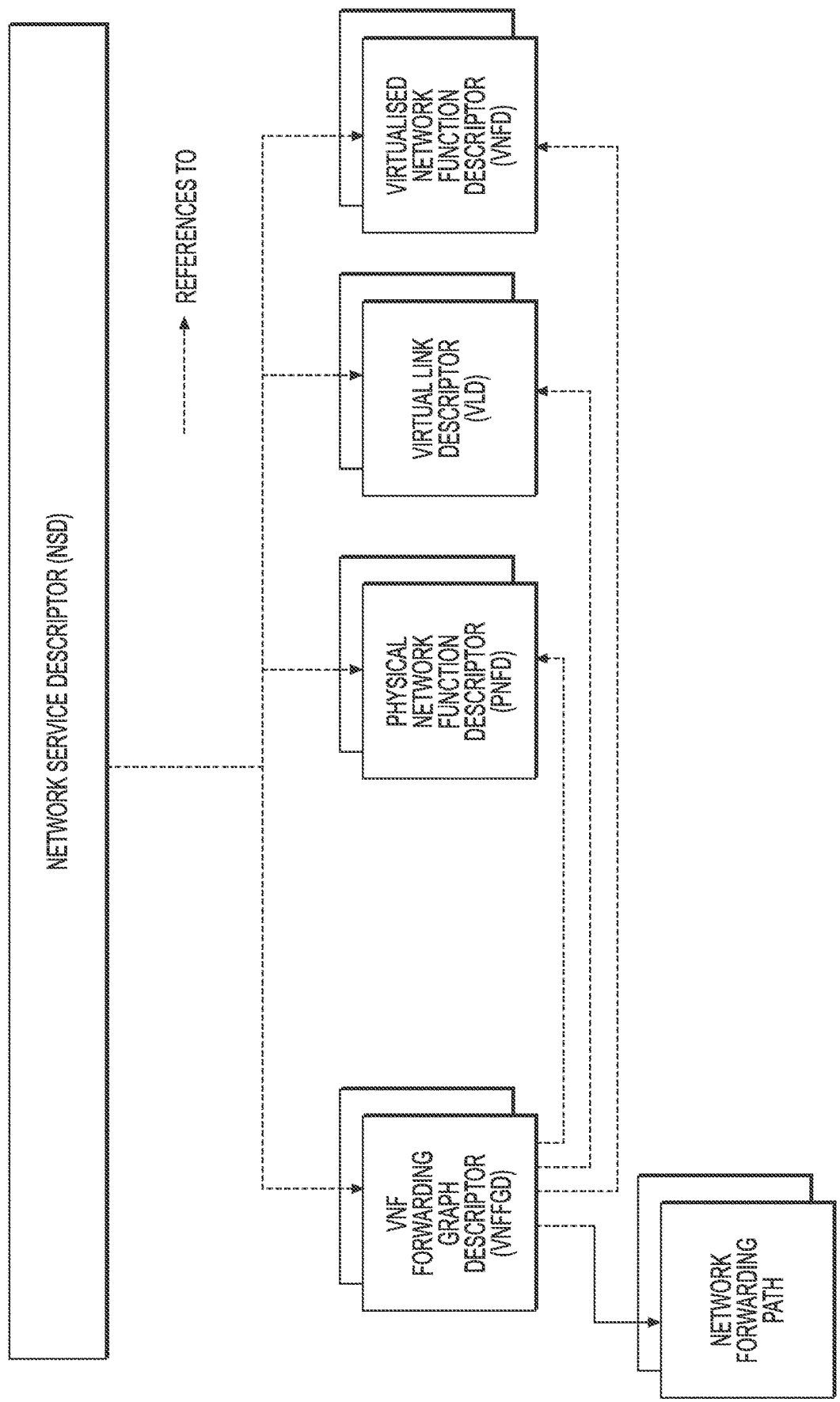
FIG. 6 illustrates an overview and composition of a NSD.

A network service (NS) is a composition of NFs arranged as a set of functions with unspecified connectivity between them or according to one or more forwarding graphs. The description of a NS as used by the NFV management and orchestration functions to deploy a network service instance includes references to the descriptors of its constituent objects. ETSI GS NFV-IFA 011 specifies a network service template for creation of object instances and the format of the VNF descriptors to be exchanged between the OSS/BSS and NFVO. The network service descriptor (NSD) is a deployment template which consists of information used by the NFV orchestrator (NFVO) for life cycle management of NSs. As shown in FIG. 6, the NSD includes the following:

One or more Virtualized Network Function Descriptors (VNFD).

Zero, one or more Physical Network Function Descriptors (PNFD) used by the NFVO to determine how to connect PNFs to VLs. The Information contained within the PNFD is limited to the description of the connectivity requirements to integrate PNFs in an NS.

Zero, one or more Virtual Link Descriptors (VLD) used by the NFVO to deploy Virtual Links (VL), and Zero, one or more VNF forwarding graph descriptors (VNFFGD).

A VNFFGD describes a topology of the network service or a portion of the network service, by referencing a pool of connection points and service access points, the descriptors of its constituent VNFs, PNFs and the VLs that connect them. It may also contain one or more network forwarding path (NFP) descriptors.

The VNFD can also indicate specific VNF "flavors" which provide further instantiation details such as number of instances of each constituent VNF or specifies "affinity rules" that indicate how to keep the VMs and hosts together.

In Release 13, 3GPP defined the service capability exposure framework (SCEF) that provides a means to expose the services and capabilities provided by 3GPP network interfaces. Several future work items were defined as part of this effort, including, for example:

Support for setting up an Application Server (AS) session with required QoS;

Support of changing the chargeable party at the session set-up or during the session;

Support of 3rd party interaction on information for predictable communication patterns;

Support for informing a 3rd party about potential network issues; and

Support for 3GPP resource management for background data transfer.

Figure 7:
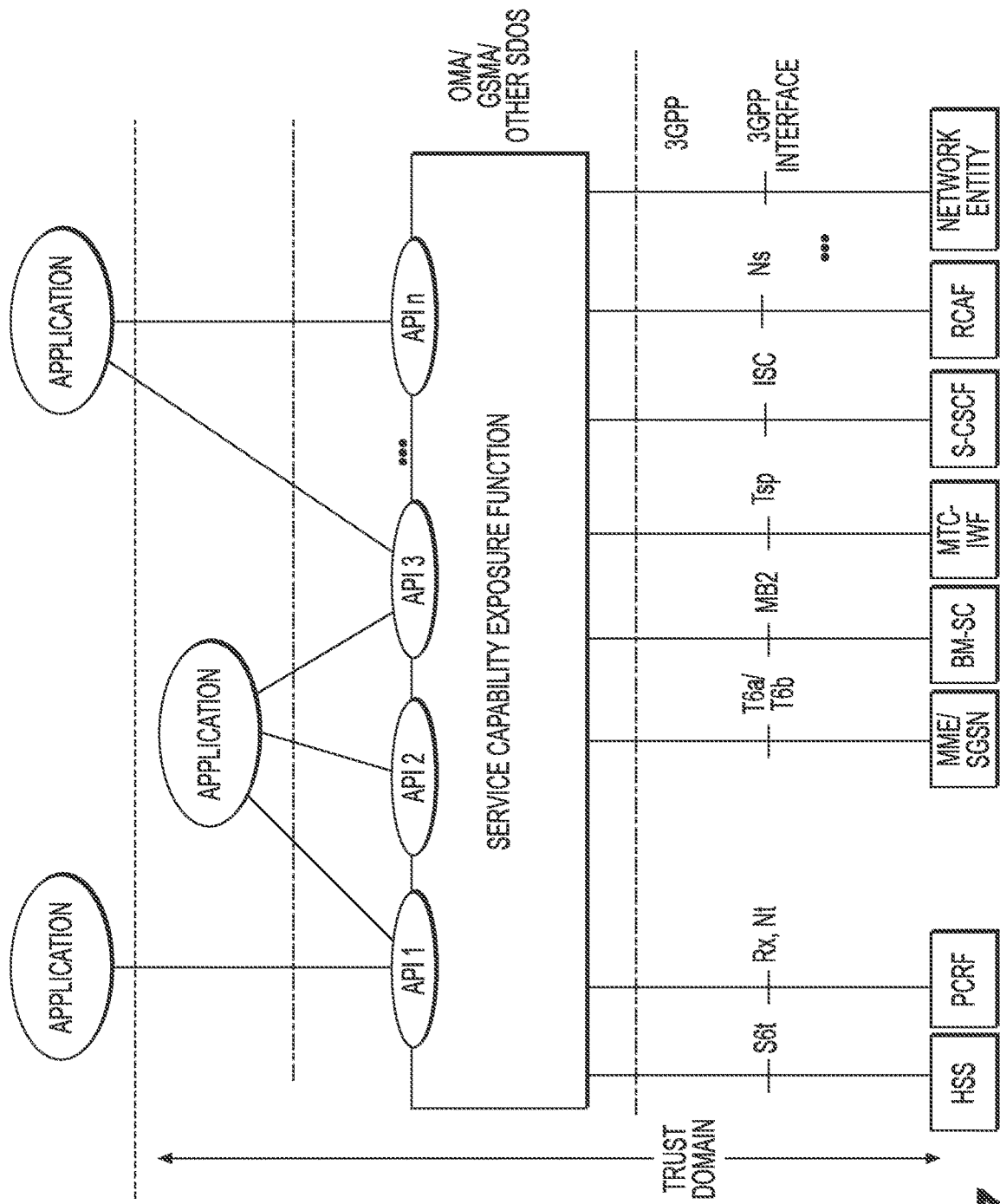
FIG. 7 illustrates 3GPP architecture for service capability exposure.

In TS 23.682, 3GPP introduced a functional block, the SCEF to provide a means to securely expose the services and capabilities provided by 3GPP network interfaces. The architecture is shown in FIG. 7. The exposure of services by the network creates capabilities that, with proper authorization, may be used to do one or more of the following: (i) retrieve information, (ii) request specific services, (iii) receive notifications, and (iv) request the setting of specific parameters. The SCEF also provides means for the discovery of the exposed service capabilities.

General Architecture

Figure 8A:
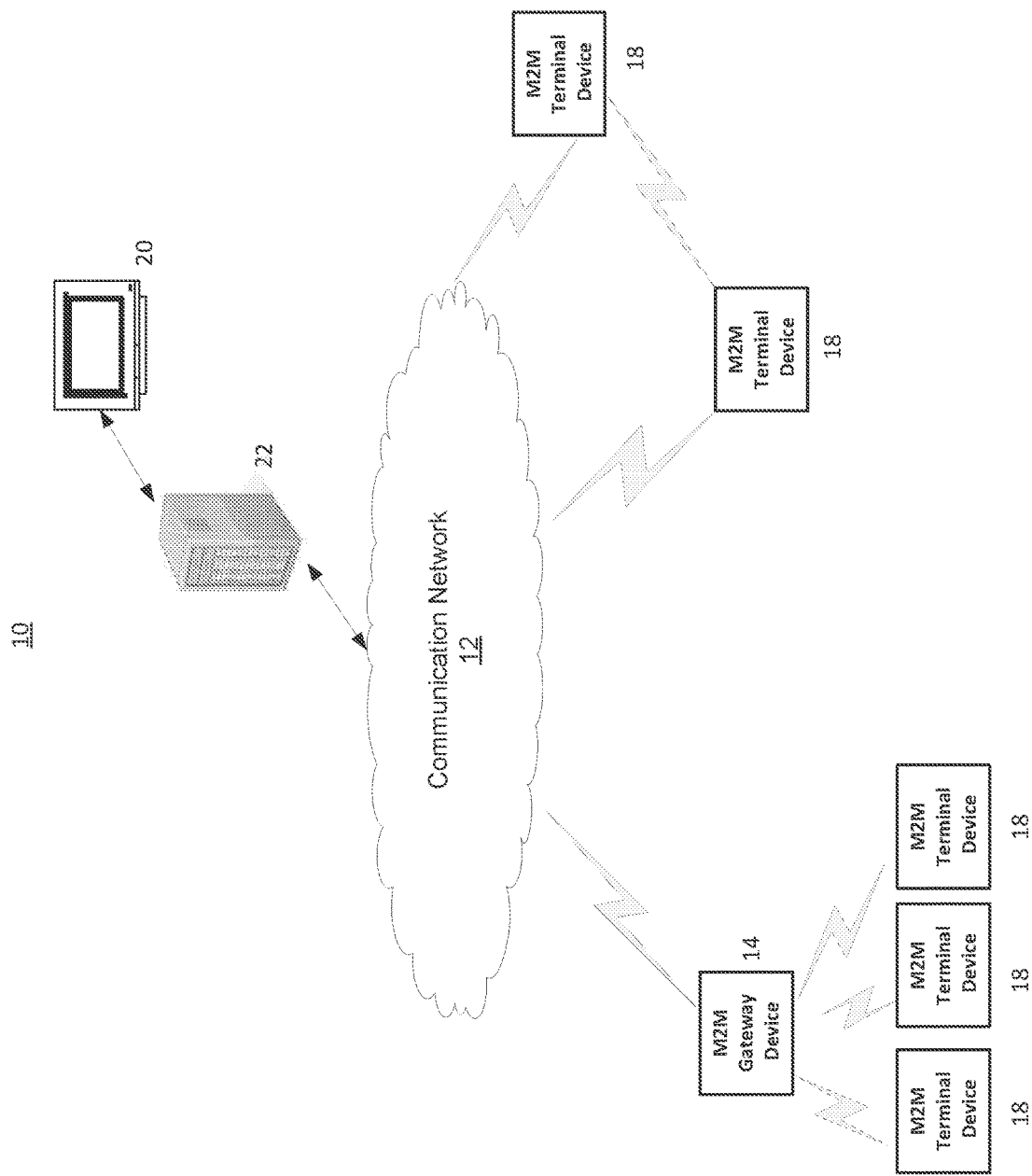
FIG. 8A illustrates an embodiment of a machine-to-machine (M2M) or IOT communication system.

FIG. 8A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Any of the nodes illustrated in any of FIGs. may comprise a node of a communication system such as the one illustrated in FIGS. 8A-8D.

As shown in FIG. 8A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 8A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 8B:
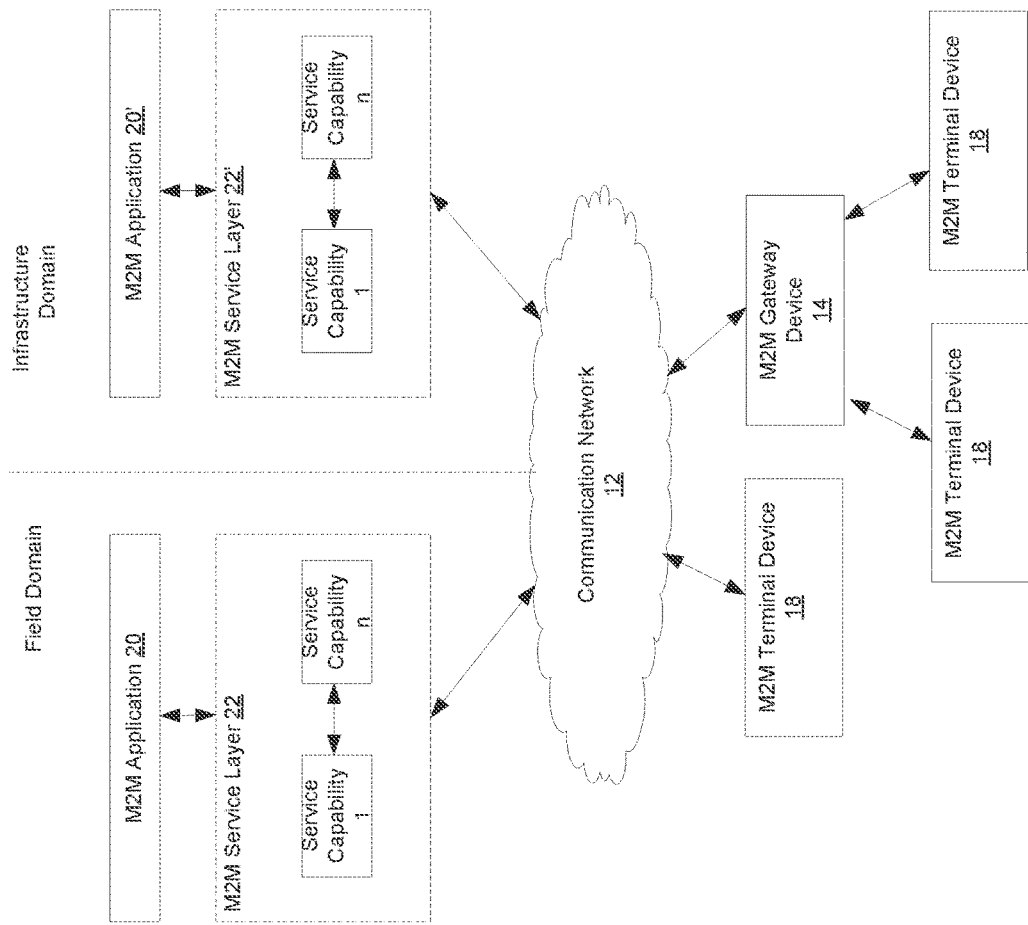
FIG. 8B illustrates an embodiment of the application of a M2M service platform.

Referring to FIG. 8B, the illustrated M2M service layer 22 in the field domain provides services for the M2M application 20, M2M gateways 14, and M2M devices 18 and the communication network 12. It will be understood that the M2M service layer 22 may communicate with any number of M2M applications, M2M gateways 14, M2M devices 18, and communication networks 12 as desired. The M2M service layer 22 may be implemented by one or more nodes of the network, which may comprises servers, computers, devices, or the like. The M2M service layer 22 provides service capabilities that apply to M2M devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M devices 18 in the field domain. It will be understood that the M2M service layer 22' may communicate with any number of M2M applications, M2M gateways and M2M devices. The M2M service layer 22' may interact with a service layer by a different service provider. The M2M service layer 22' may be implemented by one or more nodes of the network, which may comprises servers, computers, devices, virtual machines (e.g., cloud computing/storage farms, etc.) or the like.

Referring also to FIG. 8B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a service layer, such as the service layers 22 and 22' illustrated in FIGS. 8A and 8B, may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a Common Services Entity (CSE) or Service Capability Layer (SCL). A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities. The Third Generation Partnership Project (3GPP) has also defined architecture for machine-type communications (MTC). In that architecture, the service layer, and the service capabilities it provides, are implemented as part of a Service Capability Server (SCS). Whether embodied in a device SCL ("DSCL"), gateway SCL ("GSCL"), or network SCL ("NSCL") of the ETSI M2M architecture, in a Service Capability Server (SCS) of the 3GPP MTC architecture, in a Common Service Function ("CSF") or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 8C or FIG. 8D described below.

Further, the methods and functionalities described herein may be implemented as part of an M2M network that uses a Service Oriented Architecture (SOA) and/or a Resource-Oriented Architecture (ROA) to access services.

Figure 8C:
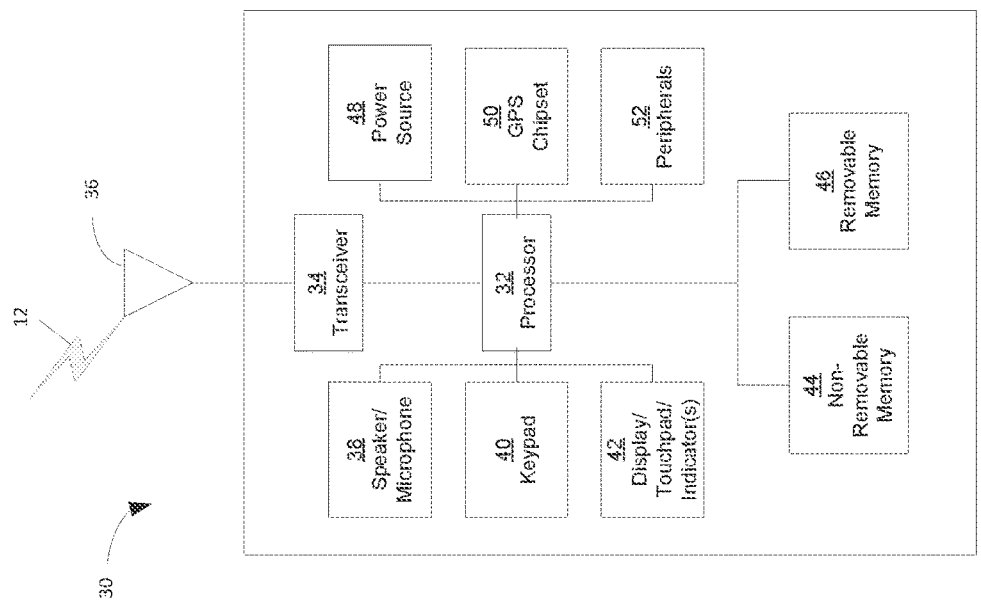
FIG. 8C illustrates an embodiment of the application of a system diagram of an example M2M device.

FIG. 8C is a block diagram of an example hardware/software architecture of a node of a network, such as one of the nodes illustrated in FIGS. 10-16 which may operate as an M2M server, gateway, device, or other node in an M2M network such as that illustrated in FIGS. 8A and 8B. As shown in FIG. 8C, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the time flexibility functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The computer executable instructions stored in the memory of the node, and executed by the processor, may further cause the node to perform the operations illustrated in FIGS. 11-15 described above. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 8C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described and illustrated herein (e.g., in FIGS. 11-15) and in the claims. While FIG. 8C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 8C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of communications and to provide a graphical user interface, such as the GUI illustrated in FIG. 16 and described above.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 8D:
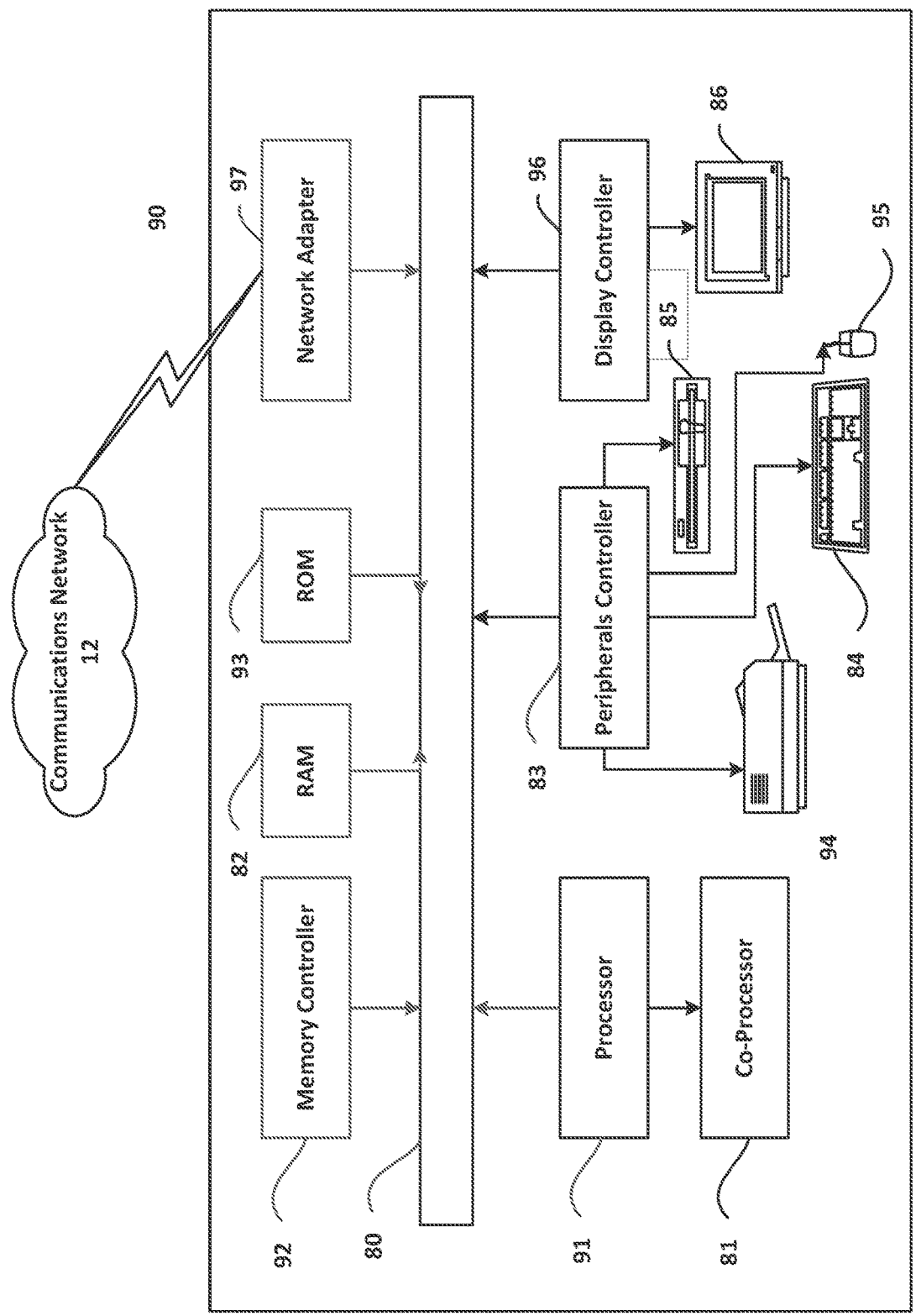
FIG. 8D illustrates an embodiment of the application of a block diagram of an exemplary computing system.

FIG. 8D is a block diagram of an exemplary computing system 90 which may also be used to implement one or more nodes of a network, such as the nodes illustrated in FIGS. 11-15, which may operate as an M2M server, gateway, device, or other node in an M2M network such as that illustrated in FIGS. 8A and 8B. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work, such as, for example, performing the operations illustrated and described in FIGS. 10-15 and the accompanying description. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Figure 16:
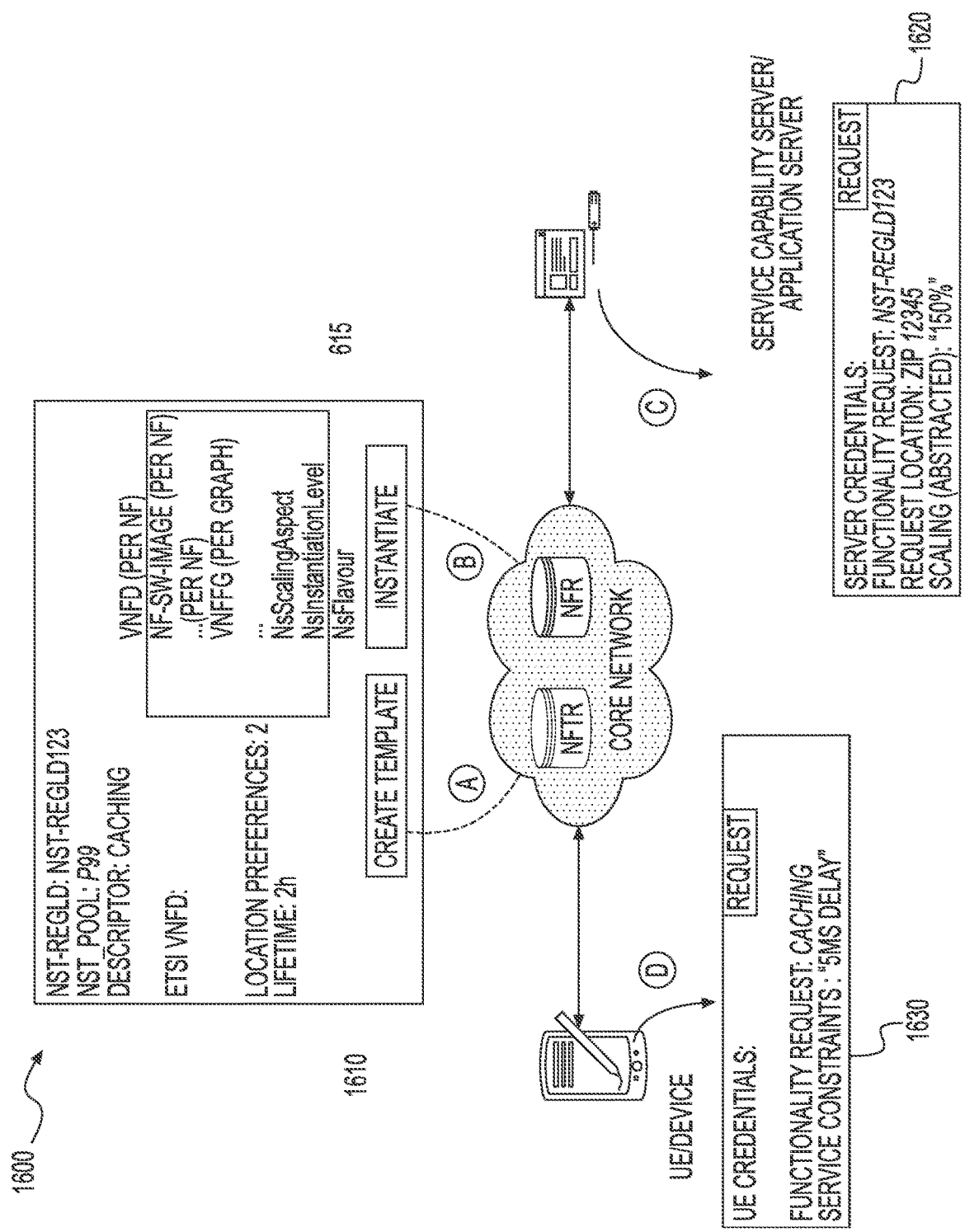
FIG. 16 illustrates exemplary graphical user interfaces of a UE, server and core network according to an embodiment of the application.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. For example, the display 86 may be used to display the graphical user interfaces (GUIs) of the user equipment, servers and/or core network as illustrated in FIG. 16 and described above.

Further, computing system 90 may contain communication circuitry, such as for example a network adaptor 97, that may be used to connect computing system 90 to an external communications network, such as network 12 of FIG. 8A and FIG. 8B, to enable the computing system 90 to communicate with other nodes of the network. The communication circuitry, alone or in combination with the CPU 91, may be used to perform the transmitting and receiving steps described herein (e.g., in FIGS. 11-15) and in the claims.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 8E:
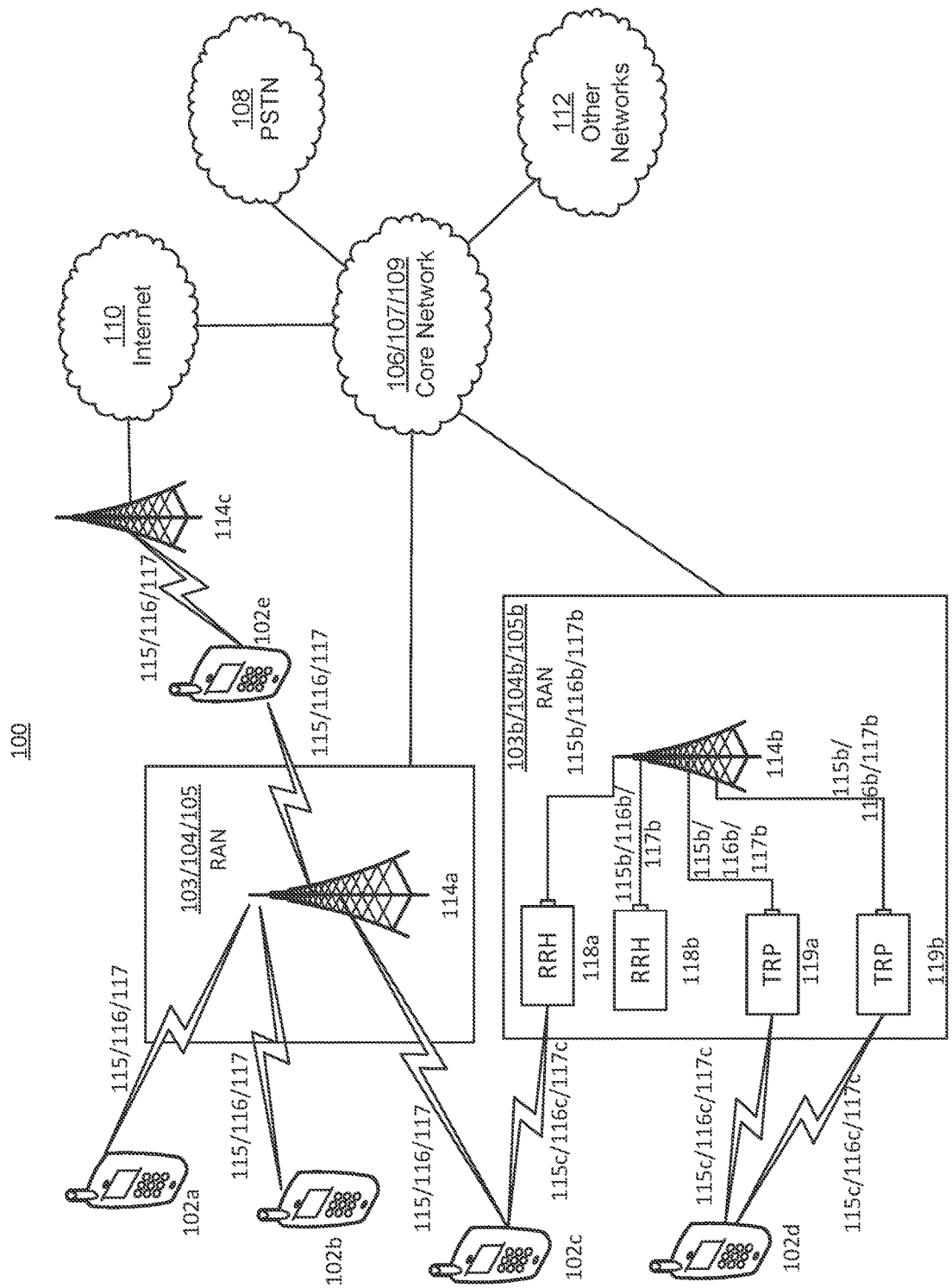
FIG. 8E illustrates an exemplary communications system according to an embodiment.

FIG. 8E illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 8E-I as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 8 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 8E, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 8E, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 8E may be configured to communicate with the base station 114a, which may employ a cellular-based radio technology, and with the base station 114c, which may employ an IEEE 802 radio technology.

Figure 8F:
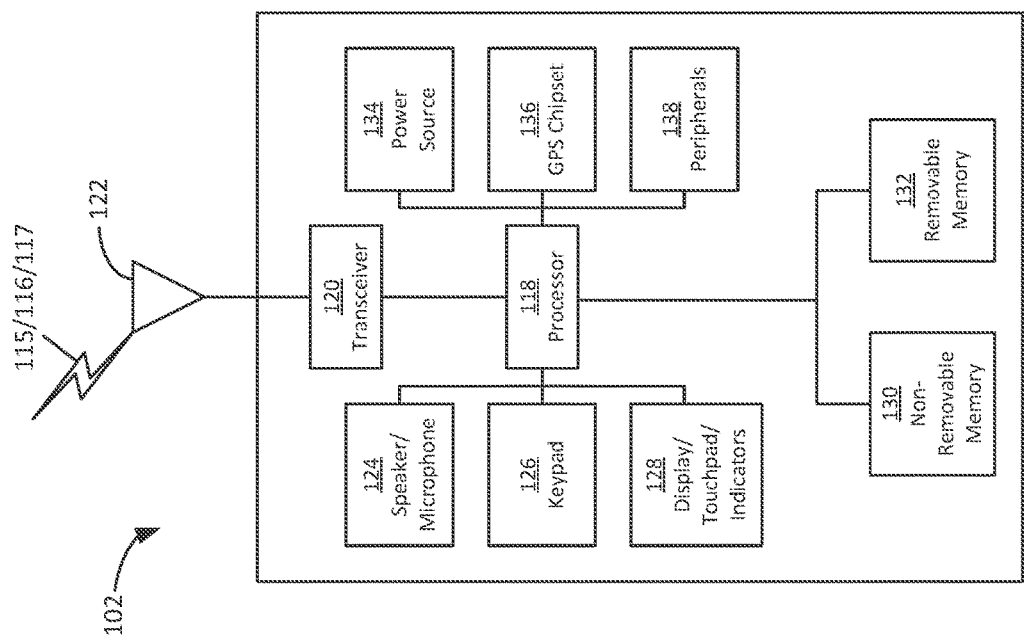
FIG. 8F illustrates an exemplary apparatus configured for wireless communication according to an embodiment.

FIG. 8F is a block diagram of an example apparatus or device configured for wireless communications in accordance with the embodiments illustrated herein, such as for example, a WTRU 102. As shown in FIG. 8F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 8F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 8F depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 8E, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 8E may be configured to communicate with the base station 114a, which may employ a cellular-based radio technology, and with the base station 114b, which may employ an IEEE 802 radio technology.

FIG. 8F is a block diagram of an example apparatus or device configured for wireless communications in accordance with the embodiments illustrated herein, such as for example, a WTRU 102. As shown in FIG. 8F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 8F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 8F depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 8F as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 8G:
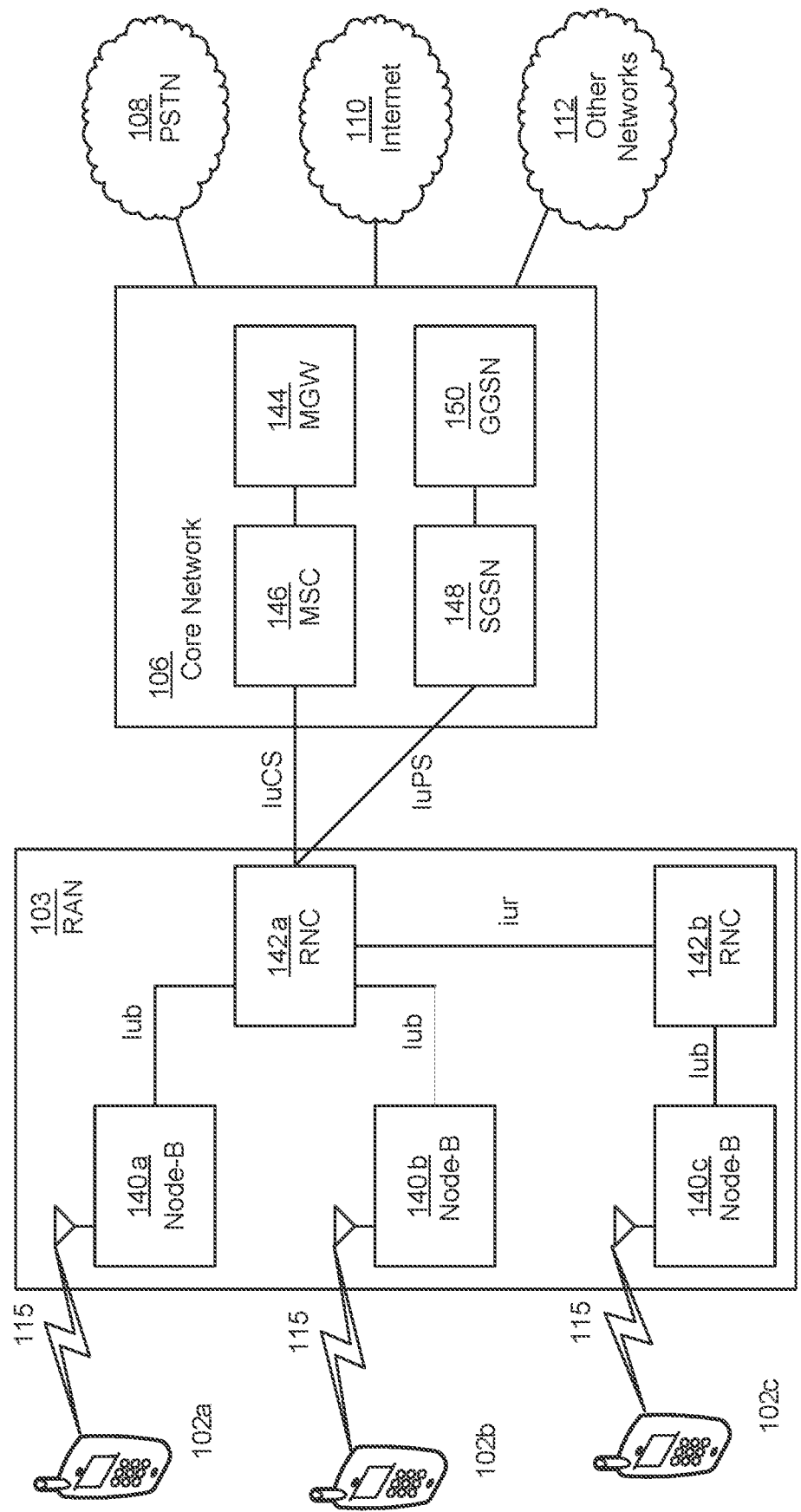
FIG. 8G illustrates a system diagram of a radio access network and a core network according to an embodiment.

FIG. 8G is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 8G, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 8G, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 8G may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 8H:
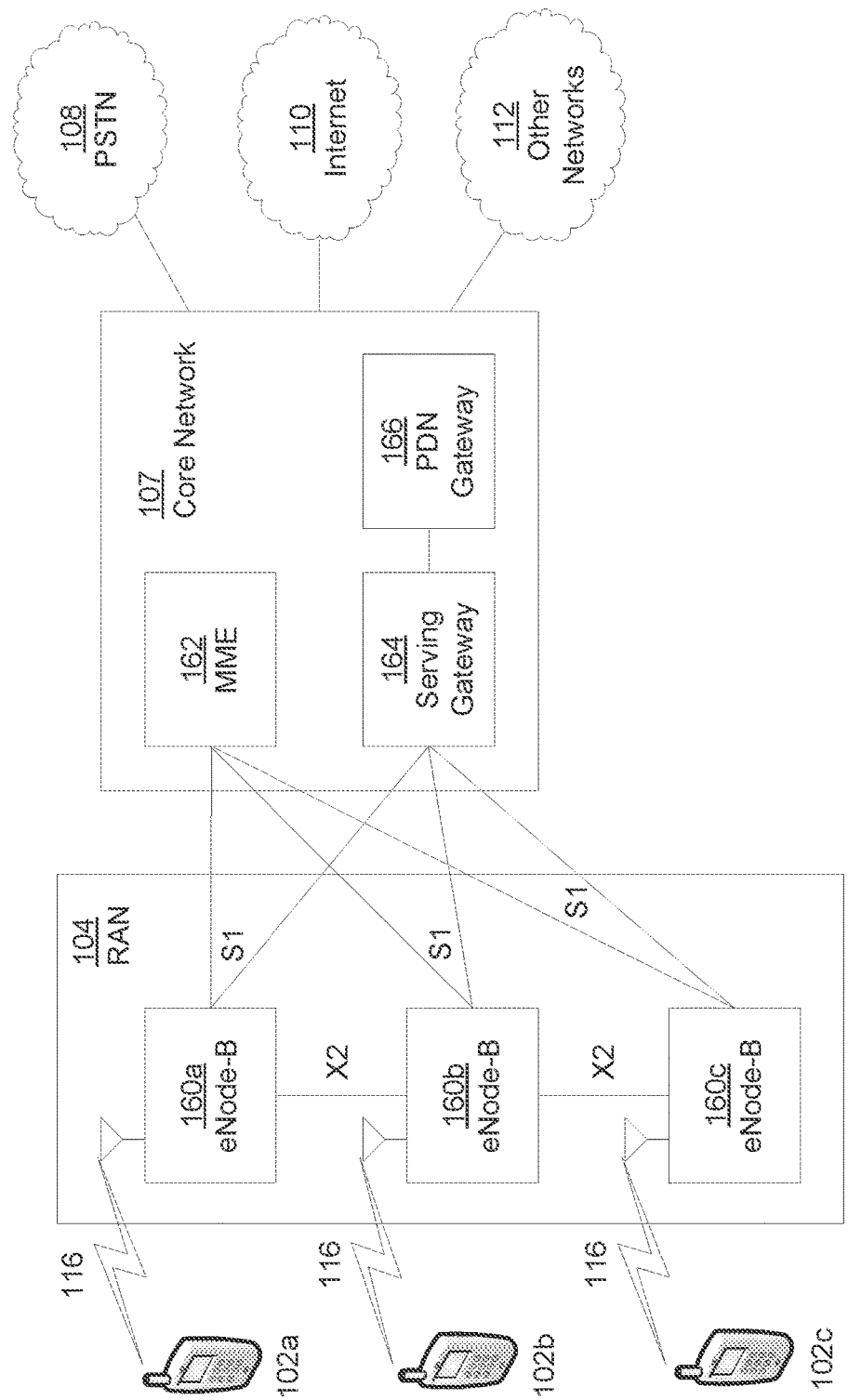
FIG. 8H illustrates a system diagram of a radio access network and a core network according to another embodiment.

FIG. 8H is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 8H, the eNode-Bs 160a, 160b, 160c may communicate with one another over an X2 interface.

The core network 107 shown in FIG. 8H may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

FIG. 8E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

Figure 8I:
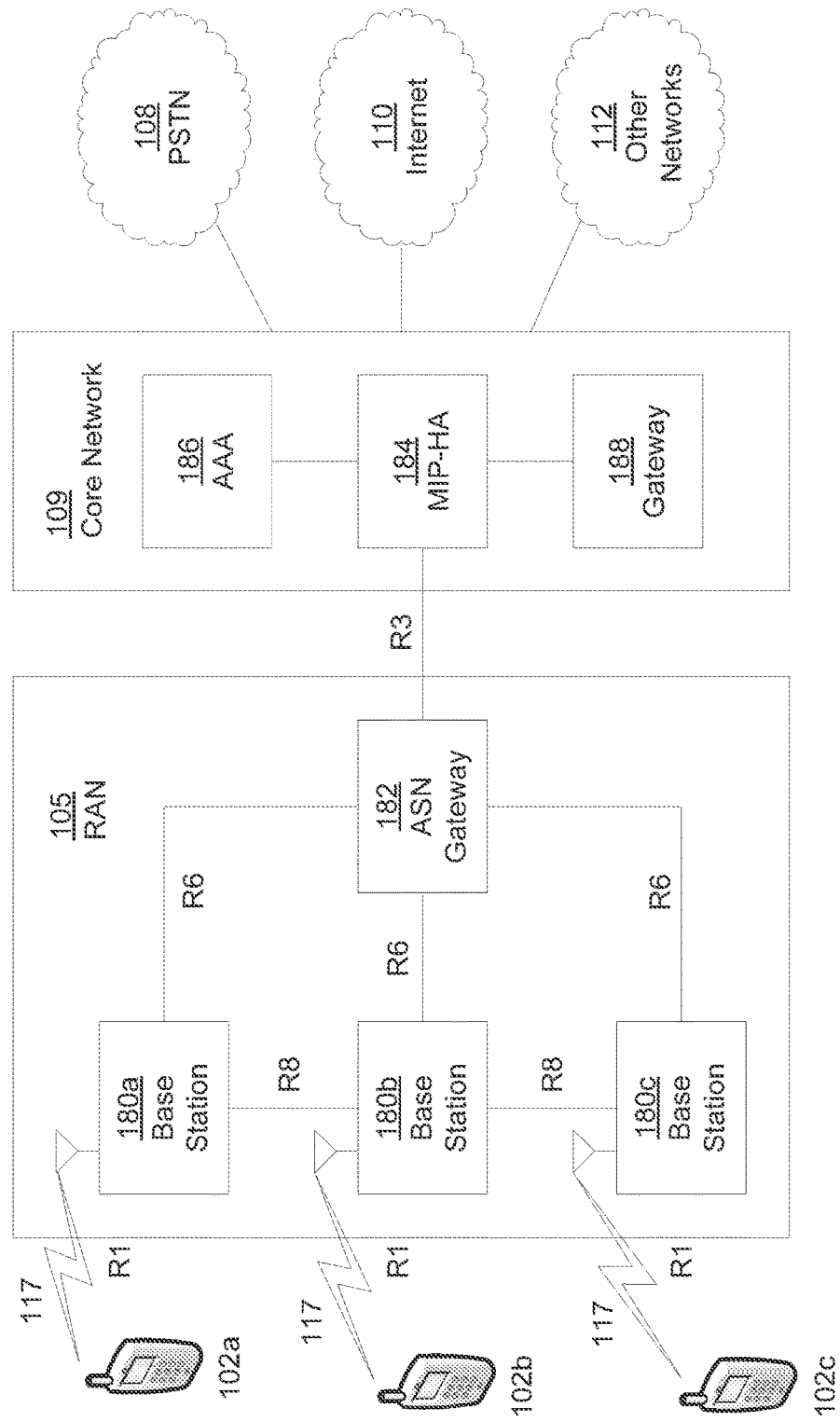
FIG. 8I illustrates a system diagram of a radio access network and a core network according to yet another embodiment.

As shown in FIG. 8I, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 8I, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 8I, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 8E, 8G, 8D, and 8I are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 8E-I are provided by way of example only, and it is understood that the subject matter disclosed and claimed herein may be embodied or implemented in any similar communication system, whether presently defined or defined in the future.

Figure 8J:
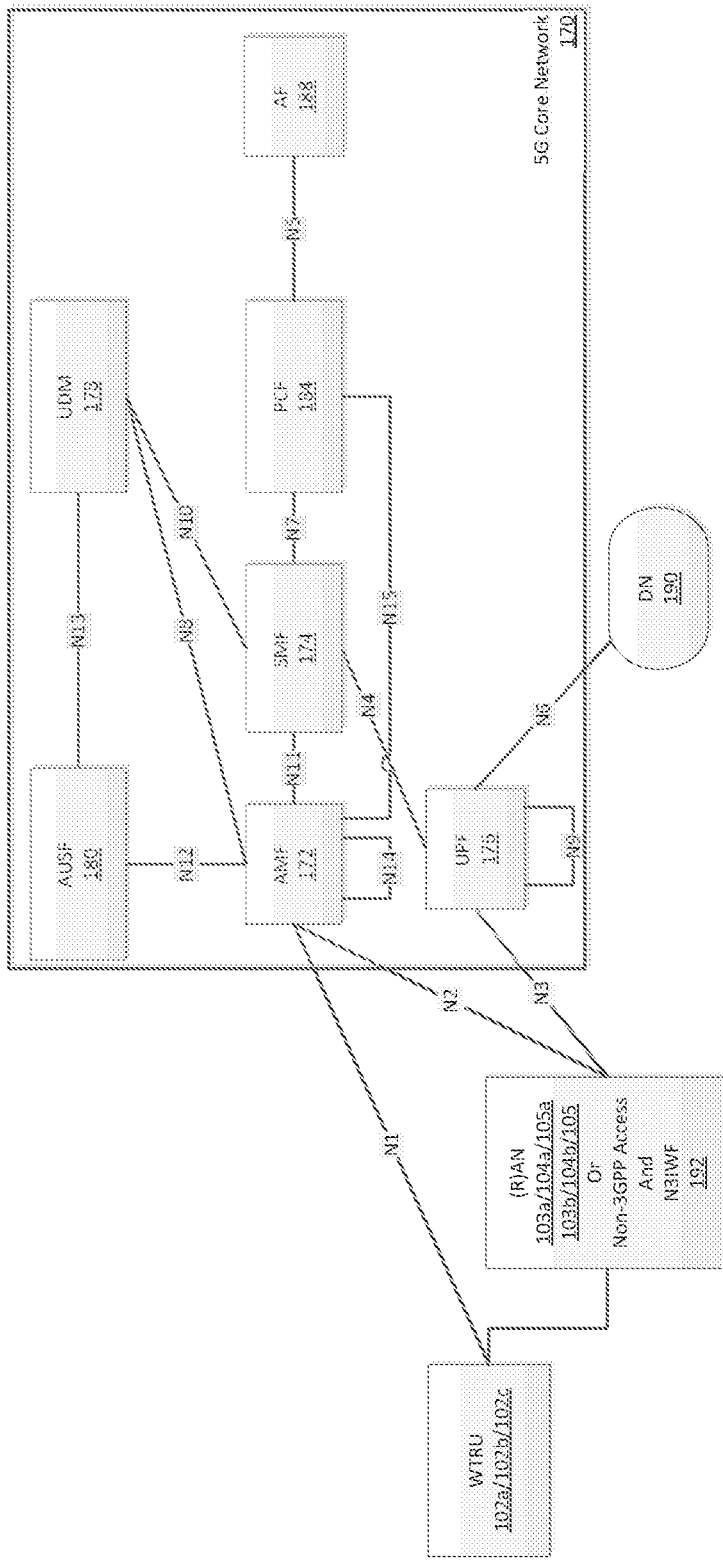
FIG. 8J illustrates the 5G core network.

The 5G core network 170 shown in FIG. 8J may include an access and mobility management function (AMF) 172, a session management function (SMF) 174, a user plane function (UPF) 176, a user data management function (UDM) 178, an authentication server function (AUSF) 180, a Network Exposure Function (NEF), a policy control function (PCF) 184, a non-3GPP interworking function (N3IWF) 192 and an application function (AF) 188. While each of the foregoing elements are depicted as part of the 5G core network 170, it will be appreciated that any one of these elements may be owned and/or operated by an entity other than the core network operator. It should also be appreciated that a 5G core network may not consist of all of these elements, may consist of additional elements, and may consist of multiple instances of each of these elements. FIG. 8J shows that network functions directly connect to one another, however, it should be appreciated that they may communicate via routing agents such as diameter routing agents or message buses.

The AMF 172 may be connected to each of the RAN 103/104/105/103b/104b/105b via an N2 interface and may serve as a control node. For example, the AMF 172 may be responsible for registration management, connection management, reachability management, access authentication, access authorization. The AMF 172 may generally route and forward NAS packets to/from the WTRUs 102a, 102b, 102c.

The SMF 174 may be connected to the AMF 172 via an N11 interface, maybe connected to a PCF 184 via an N7 interface, and may be connected to the UPF 176 via an N4 interface. The SMF 174 may serve as a control node. For example, the SMF 174 may be responsible for Session Management, WTRUs 102a, 102b, 102c IP address allocation & management and configuration of traffic steering rules in the UPF 176, and generation of downlink data notifications.

The SMF 174 may also be connected to the UPF 176, which may provide the WTRUs 102a, 102b, 102c with access to a data network (DN) 190, such as the Internet 110, to facilitate communications between the WTRUs 102a, 102b, 102c and IP-enabled devices. The SMF 174 may manage and configure traffic steering rules in the UPF 176 via the N4 interface. The UPF 176 may be responsible for interconnecting a packet data unit (PDU) session with a data network, packet routing and forwarding, policy rule enforcement, quality of service handling for user plane traffic, and downlink packet buffering.

The AMF 172 may also be connected to the N3IWF 192 via an N2 interface. The N3IWF facilities a connection between the WTRUs 102a, 102b, 102c and the 5G core network 170 via radio interface technologies that are not defined by 3GPP.

The PCF 184 may be connected to the SMF 174 via an N7 interface, connected to the AMF 172 via an N15 interface, and connected to an application function (AF) 188 via an N5 interface. The PCF 184 may provide policy rules to control plane nodes such as the AMF 172 and SMF 174, allowing the control plane nodes to enforce these rules.

The UDM 178 acts as a repository for authentication credentials and subscription information. The UDM may connect to other functions such as the AMF 172, SMF 174, and AUSF 180.

The AUSF 180 performs authentication related operations and connects to the UDM 178 via an N13 interface and to the AMF 172 via an N12 interface.

The NEF exposes capabilities and services in the 5G core network 170. The NEF may connect to an AF 188 via an interface and it may connect to other control plane and user plane functions (180, 178, 172, 172, 184, 176, and N3IWF) in order to expose the capabilities and services of the 5G core network 170.

The 5G core network 170 may facilitate communications with other networks. For example, the core network 170 may include, or may communicate with, an IP gateway (e.g., an IP multimedia subsystem (IMS) server) that serves as an interface between the 5G core network 170 and the PSTN 108. For example, the core network 170 may include, or communicate with a short message service (SMS) service center that facilities communication via the short message service. For example, the 5G core network 170 may facilitate the exchange of non-IP data packets between the WTRUs 102a, 102b, 102c and servers. In addition, the core network 170 may provide the WTRUs 102a, 102b, 102c with access to the networks 112, which may include other wired or wireless networks that are owned and/or operated by other service providers.

Figure 9:
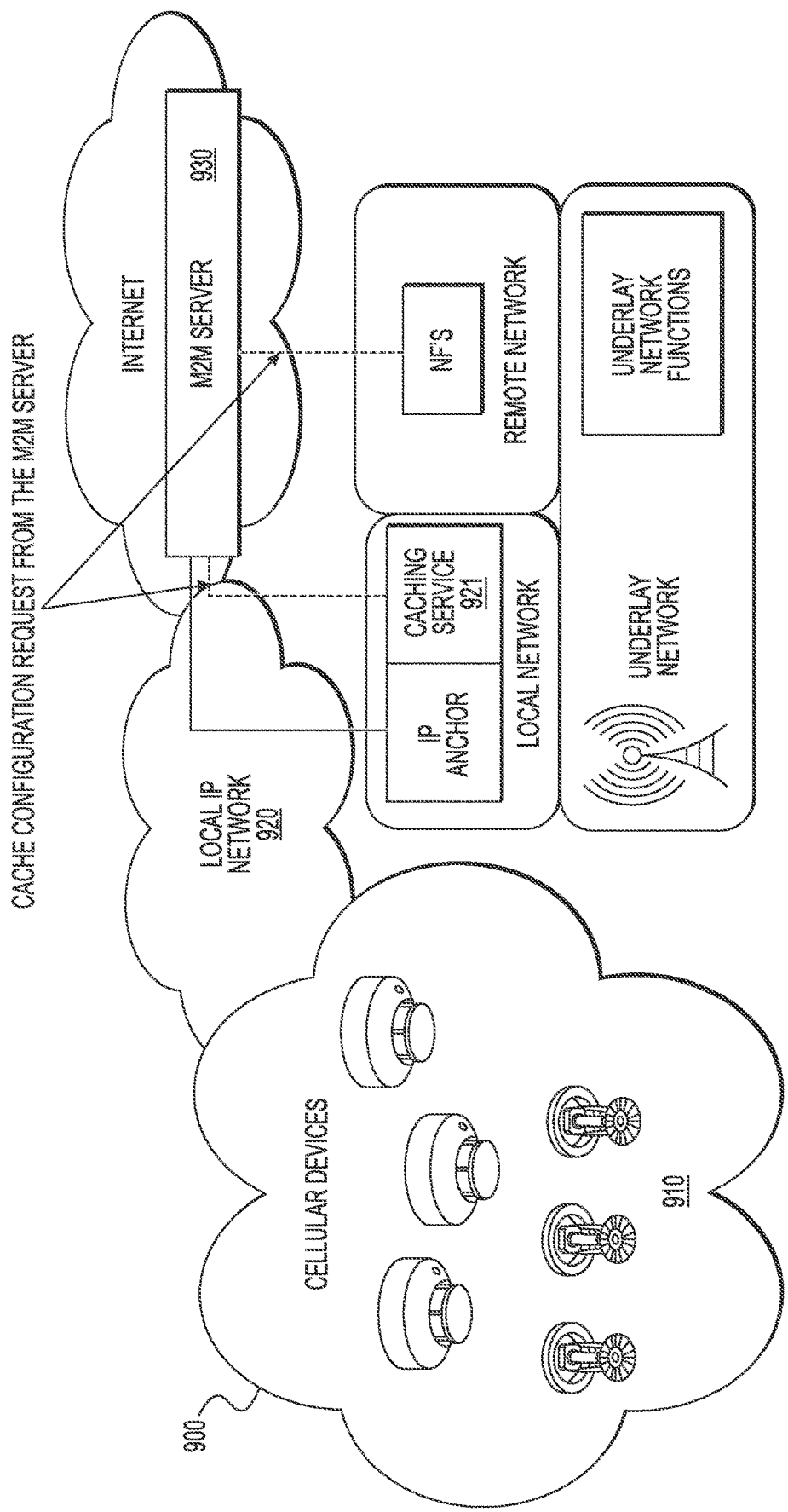
FIG. 9 illustrates an exemplary use case according to an embodiment of the application.

In one embodiment, an exemplarily use case is provided with respect to the present application. The use case is exemplarily shown in FIG. 9. Specifically, sensors 910 are deployed in a warehouse 900 carrying hazardous materials. Due to the critical nature of the sensors 910, an emergency transmission from one of the sensors 910 over the local IP network 920 must be sent with minimal delay. To conserve energy, the sensors 910 are periodically available to receive read requests over the local IP network. It is envisaged that these constrained sensors 910 may use a third party cache service 921 in a local IP network, e.g., core network 920 to store readings in order to efficiently return to a power efficient mode. Hence, the sensors 910 do not need to wait for a communication from the M2M server 930. Separately, it is envisaged that the M2M server 930 may instantiate and configure services for its devices and control their location.

Core Network Architecture for Service Exposure

This section describes a SCEF API that can be exposed to an AS and used to configure a network function or slice that is used by the AS to provide services to the UE(s). The API may also be exposed by the UE's OS and/or modem platform and used by the UE OS or UE applications to make network configuration request. In this application we refer to the API as a SCEF API. However, this same functionality may be exposed and provided by other network functions. Call flows are described to show how each API call would be executed when called from the AS.

Figure 10:
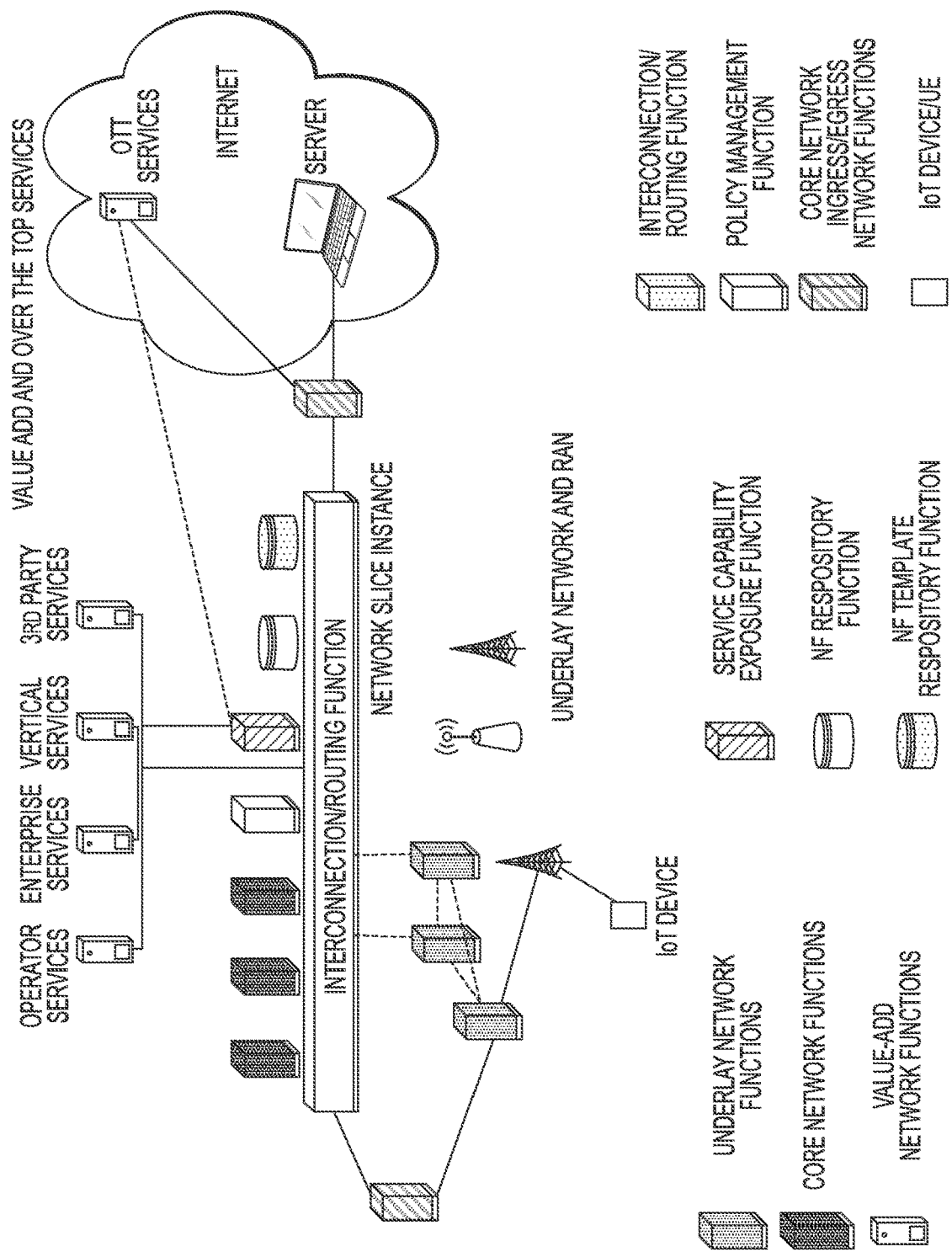
FIG. 10 illustrates 5G network architecture for network exposure according to an embodiment of the application.

According to one embodiment as exemplarily shown in FIG. 10, a network architecture highlights entities involved in providing exposure of network capabilities to entities external to the Core Network. In an exemplary embodiment, the network architecture is based on 5G. The 5G network is designed to provide connectivity via multiple and different RATs and to rely on NFV techniques. In the core network, virtualized network functions will be grouped together into network slices to provide one or more services to a UE and/or a group of UEs. A UE may be permitted to simultaneously connect to more than one network slice. Network slices will not interact directly with each other for providing services although they may run on the same physical platform and they may interface to some common functions such as those in the underlay network.

The underlay network includes core network functions that UEs require to establish a connection and obtain a minimum level of service required before the UE can be authenticated, authorized, and permitted to connect to a network slice. For example, the underlay network contains the SISF for MCN slice instance management which may interact with the MCN MANO for instantiating new NFs in the slice.

Policy management is provided via the PMF function depicted in the CN slice instance and which may be instantiated in the underlay network as well. PMF abstracts the PCRF management functionality as described by 3GPP.

Network functions within a slice communicate via an interconnection and routing function (IRF). In roaming scenarios, the IRF's of each slice (or part of the slice) will communicate via an IRF Interworking (IRF-IWK) function in the underlay network.

Operator-defined, enterprise, vertical, and third party services may be deployed as network functions in a tenant domain or an over the top (OTT) manner. When deployed within the CN, they can be connected via the operator's IRF and integrated into the operators' NFV framework. From a control perspective, the services interact with the network slice via a SCEF that allows them to be configured for receiving and providing services within the network slice.

Such services may also be deployed in OTT manner via the slice's egress node. OTT services may be deployed to also interact with the network slice via a specialized exposure function, e.g., SCEF.

In the 5G architecture, it is proposed that SCEF has access to the NFTR and NFR. Both NFTR and NFR may be connected to the slice NF(s) via the IRF as shown in FIG. 10. It is envisaged that the depicted functionality is fully contained within a slice. Depending on the implementation, they may instead be located within the underlay network, or might have components within the underlay network which may communicate with multiple slices.

Network Function Template Repository

According to an embodiment, the NFTR is a database of NF templates. The NFTR may reside in the underlay network and be shared across network slices or the network slice may have its own NFTR. Alternatively, each slice may have its own interface to a common NFTR. The interface may filter requests from the slice such that each slice can only see templates that are authorized for the slice. The NFTR may include templates that are available to be instantiated by the slice. The templates may describe how each NF instantiation may be configured. The following techniques are envisaged to be supported by NFTR:

(i) NF Template registration: receives and maintains the NF templates as requested by other authorized Core NFs or SCSs/ASs.

(ii) NF Template discovery: method to discover and retrieve NF template instances.

(iii) Subscription/Notification: consumer functions may subscribe to the repository and be notified of NF template creation, deletion, modification.

It is envisaged that if the originator (of the registration/discovery/subscription) is an SCS/AS, the originator will send the request to the SCEF who will act as the consumer NF.

Network Function Repository

The NFR is a database or listing of the NFs that are in a given slice. Generally, there may be an NFR associated with each slice. Alternatively, the NFR may reside in the underlay network and be shared across network slices. When the NFR is shared across network slices, the NFR contains a listing of NFs instantiated in each network slice. The NFR may be queried or indexed based on Network Slice ID. When queried, the NFR may provide a listing of the NFs that are instantiated in the slice and information about how each NF is configured, including information about the template associated with the instance. Additionally, the NFR will provide identifiers that may be used to contact each NF. The identifiers may be NF identifiers. The following procedures are supported by NFR:

(i) Core-NF registration: receives and maintains the profile information of NF when deploying new NF in control plane.

(ii) Core-NF discovery: generic method to discover and access NF instances.

(iii) Registration and Discovery for non-Core-NFs.

(iv) Consumer NF Subscription/Notification: consumer NFs may subscribe to the repository and be notified of NF creation, deletion, modification and state changes affecting instantiation e.g., start/stop of the provider NF.

(v) State monitoring: NF states (e.g., started/stopped) are reflected in the NFR.

NFR and NFTR Exposure

In an embodiment, it is envisaged that the MCN expose the ability to instantiate NFs. NFs may be classified as "Value-Add" or "Core", "Functions" or "Services", and "Templates" or "Instantiation". These terms are described in more detail below:

Value Add and Core Functions: A core function is a function that is defined by 3GPP. A value-add function is a function that is provided by the MNO and not strictly required to provide connectivity. It is envisaged according to this application that the value-add and core functions are interchangeable. It is assumed that access control, storage isolation, etc. methods may be employed in implementing the necessary privacy/security. The exposure methods are considered in a unified manner.

Functions and Services: A function may be the smallest unit that is instantiated in the network. A service is functionality that is provided to the end user via instantiating one or more functions. As described above, existing work provides descriptors for function instantiation at both the network function (VNFD) level and the network service (NSD) level. The NS is defined as a composition of NFs. The NS and NF may interchangeably be used throughout this application. For example, the term NFR refers to a repository for both functions and services. Similarly, the term NFT refers to a template that describes a function, a service or a network slice. The difference rests in the order of magnitude of functional compositional complexity. That is, it may span simple functions and composite services to complex slices, and uses the same methodology.

Template and Instantiation: A template describes how to create an NF, slice, or service. A template may be provided to a hypervisor so that the NF, slice, or service can be created. The created NF, slice, or service is the instantiation. The templates in turn may be in "Abstract" or "Deployable" formats. The deployable formats may be standardized forms which allow for instantiation in the NFV system, e.g., templates defined by the ETSI NFVD descriptors. The Abstract formats may be a format that is employed for a specific domain only, and in which abstract information should be encapsulated within a domain. There may be other standardized templates with a higher level of abstraction or may be MNO-defined. The abstract formats will be translated within the CN using domain policies and settings before being consumed by the CN MANO. According to the template descriptions herein, new parameters are provided at the abstract level while incorporating existing formats (e.g., ETSI) which are provided in a more detailed, deployable level.

According to an embodiment, a NFTR provides management of NF templates. The SCEF exposes CN APIs that allow third party services to access and determine what NFs may be instantiated and how the NFs may be configured. The SCEF also exposes CN APIs that allow third party services to determine what NFs are available within the slice. These APIs may also be used to obtain identifiers for the available NFs. The identifiers may then be used to query the NFs and access their functionality. Third party services may access the NFs via the core network APIs as exposed by the NFR/NFTR or as exposed by the SCEF For example, the third party service may query the NFR to obtain the identifier of a mobility management NF. The query may also ask what mobility management function is serving a particular UE. The third party service may receive a mobility management NF identifier in response to the query and then use the identifier to address the mobility management NF and query the UE's location. The query of the mobility management NF may be performed via the SCEF or by directly addressing the NFR.

It is envisaged this functionality allows exposure of the NFR and NFTR repositories to the value-add and OTT domains. Exposure is provided via core network APIs that enable the AS and UE to provide the network with information required to configure the CN functionality including VA-NFs and OTT-NFs.

TABLE 3 shown below introduces the NF template. In addition to parameters needed by MANO for function instantiation (e.g., ETSI NS template), additional parameters are proposed. These parameters are necessary within the MCN to be able to provide specialized services e.g. location-specific instantiation, charging, NF pooling, service constraints and policy application, etc.

TABLE 3

| Attribute | Description |
|---|---|
| Existing ETSI Template information | |
| NSD Identifier(s) | Reference NSD of the requested NF |
| VNFD Identifier(s) (per NF) | Reference VNFD of each required VNF |
| NF-SW-image(s) (per NF) | Software image of each NF, as well as software image information e.g. manufacturer, version, etc. |
| NF-script (per NF) | Scripts per NF used in NF instantiation |
| VNFFG Identifier (s) | Reference for the VNF forwarding Graph. The IE related to VNF forwarding Graph Descriptor |

TABLE 3-continued

| Attribute | Description |
| --- | --- |
| Ns Vid IE (s) | as described might be included The NsVld information element provides general information enabling the instantiation of virtual links. |
| Pnfd (s) | IE related to the Physical Network Function Descriptor. This IE is a deployment template enabling on-boarding PNFs and referencing them from an NSD. It focuses on connectivity aspects only. |
| Scaling IEs | NsScalingAspect, NsInstantiationLevel, VnfToLevelMapping, NsToLevelMapping NEW Parameters |
| NFT-RegId | NFT Registration Identifier |
| NFT Pool | Indicator for a template pool that this NFT is part of. Several NFT Pools may be defined, e.g. a caching NFT pool containing all the templates for caching functions. |
| Descriptor | Descriptor of the type of function provided by the network function. This could be from a fixed set of reserved keywords (e.g. Caching, Parental control, etc.). Alternatively this may be a human readable description of the function. |
| Type | Indicates type of network function: "Value-Add" or "Core" |
| SFC enabled flag | Shows if the function is SFC enabled. |
| Location Preferences | Identifies preferred location for instantiation. Might be generic (e.g. CN0, specific slice ID(s), physical location). |
| Service Policies | Indicates Policies related to the Services provided by this NF/NS. For example if this NF/NS is allowed to be instantiated for a single UE or multiple ones, specific groups, etc. |
| Service Constraints | Indicates the entities or types of entities which may be allowed to use the services of the NF/NS. For example, it may list specific UEs or types of UEs that are permitted to use the services of the function (whitelist) or specific UEs that are prohibited from using the services of the function (blacklist). |
| Charging Info | Indicates what types of charging information should be captured when instantiating this service. For example charging per function instantiation, charging per UE/flow, etc. Other parameters may include specific types of events to be used for charging purposes, such as, but not limited to: Virtualized Computational Resource Usage, Virtualized Storage Usage Virtualized Network Usage, Reserved Memory Reserved Network Resource Usage Reserved Computational resources |
| Communication Mechanism | Indicates how the network function communicates with other network functions. For example through a messaging bus or through a restful API. |
| Lifetime | Indicates how long the network function should be in operation after instantiation. The network function may be limited to only operate for a limited duration. |
| SourceLink | Indicates where the source for the network function may be found. For example if the network function is stored as a software file, the SourceLink may point to this file. |

NFR and NFTR Exposure APIs

According to another embodiment, the SCEF may expose APIs that allow 3$^{rd}$ parties to access the functionality of the NFR and NFTR. Alternatively, these APIs may be exposed directly to 3$^{rd}$ party server and other NFs. It is envisaged that these methods can be exposed to external entities and used to instantiate NFs to provide services to the UE(s). A corresponding API may be made available to SCS/AS or may be used by the OS and/or modem platform of an UE to make network configuration requests.

TABLE 4 shown below lists APIs that may be exposed by the SCEF to allow for accessing the functionality of the NFR and NFTR.

TABLE 4

| API Name | Description |
| --- | --- |
| Registration | Adding an NF or NFT to the NFR or NFTR respectively. |
| Discovery | Discovering NF or NFT to the NFR or NFTR respectively. |
| Subscription/ Notification | Subscribing to changes at the NFR/NFTR |
| NF Instantiation | Based on existing NFT or provided in the request |
| NF Instance Management | Several procedures for instance management with a similar procedural flow, see bullets below. |
| NF Instance Reconfiguration | Existing NF instance change of parameters |
| NF Instance Termination | Existing NF instance termination |
| NF Instance Scaling | Existing NF instance change by scaling up/down |
| NF Instance State Change | Existing NF instance change of state |

Registration API

In an aspect of the application, the registration API is used to add an NFT to the NFTR or to add an NF to the NFR. An NFT may be added to the NFTR when the API caller wants to advertise a particular, available function or service. An NF may be added to the NFR when the API caller wants to indicate that a NF has been instantiated or an existing NF's configuration has changed. For example, when a SCS/AS initiates a request, the request is sent to the SCEF. The SCEF verifies the authority to submit this request. If verified, the request proceeds as a consumer Core-NF. Alternatively, the request may come directly from another Core-NF.

Figure 11:
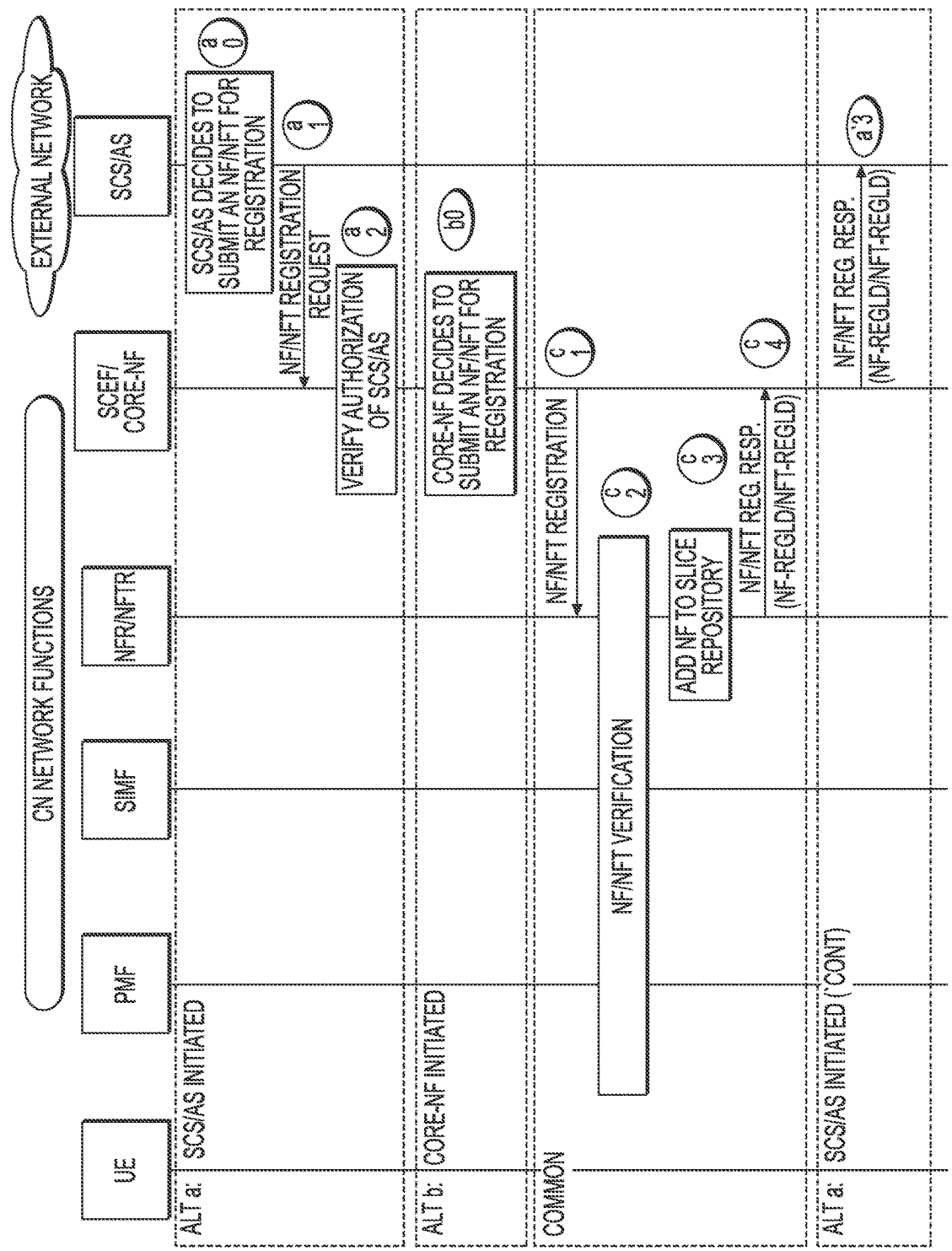
FIG. 11 illustrates a registration flow according to an embodiment of the application.

In an embodiment as exemplarily shown in FIG. 11, procedures for the registration of NFs (at NFR) or NFTs (at NFTR) are disclosed. Each of the steps is referenced by an alpha-numeric designation, e.g., a0, a1, etc. In one embodiment, i.e., procedure 'a', the SCS/AS decides to submit an NF or an NFT for registration (step a0). Next, the NF/NFT Registration Request is sent to the SCEF (step a1). The SCEF verifies that the SCS/AS is authorized to make such a request (accessing other MCN nodes as needed) (step a3). In an alternative embodiment as shown in FIG. 11 as procedure a template or function registration may be initiated by a Core-NF. For example a Core-NF internal processing results in a decision to request this registration (step b0).

Subsequent to the above-mentioned embodiments in FIG. 11, the following steps are considered common. Here, the SCEF's role may be similar to that of any other Core-NF which might initiate this procedure, such as form example, a SIMF. In step c1, the SCEF/Core-NF forwards the registration request. The registration request message may include the following parameters which have been received by the SCEF from the SCS/AS or have been generated by the Core-NF. These parameters, e.g., inputs, include:

1. Requester Credentials: Enable authorization and authentication, as well as signatures for the NSD/VNFD 2. Template Description: Provided in TABLE 3 above.

In the NF registration, the template provides a description of a function which may be instantiated. Depending on local policies, a NF registration that provides a template which is not part of the NFTR may result in a parallel NFT registration. According to step c2, the NF or NFT to be registered undergoes verification using the services of other NFs such as, for example, the SIMF and PMF. The PMF may validate the request against other existing policies. The PMF also registers the new NF/NFT policies. SIMF may provide current slice instance state information which helps in verification.

Next in step c3, the NFR/NFTR proceeds with registration. In other words, the function/template is added to the repository. An identifier (NF-RegId or NFT-RegId) is generated to identify the entity within the registry. Thereafter, the NFR/NFTR sends registration response to SCEF/Core-NF, including outputs of the registration procedure (step c4). These outputs may include but are not limited to: (i) Newly generated entity identifiers e.g. NF-RegId or NFT-RegId; and (ii) Success or Failure indicators.

In another embodiment of this aspect, a further step is envisaged for procedure 'a'. Specifically, in step a'3, if the request originated with an SCS/AS, the SCEF forwards the registration response and outputs to the originator.

Discovery and Subscription/Notification APIs

According to another aspect of this application, the discovery APIs may be used to allow the originator to search for available NFs in a slice and available NFTs to be instantiated in a slice. This may be attributed to matching search criteria. In this aspect, the terms subscription and notification may interchangeably be used.

Figure 12:
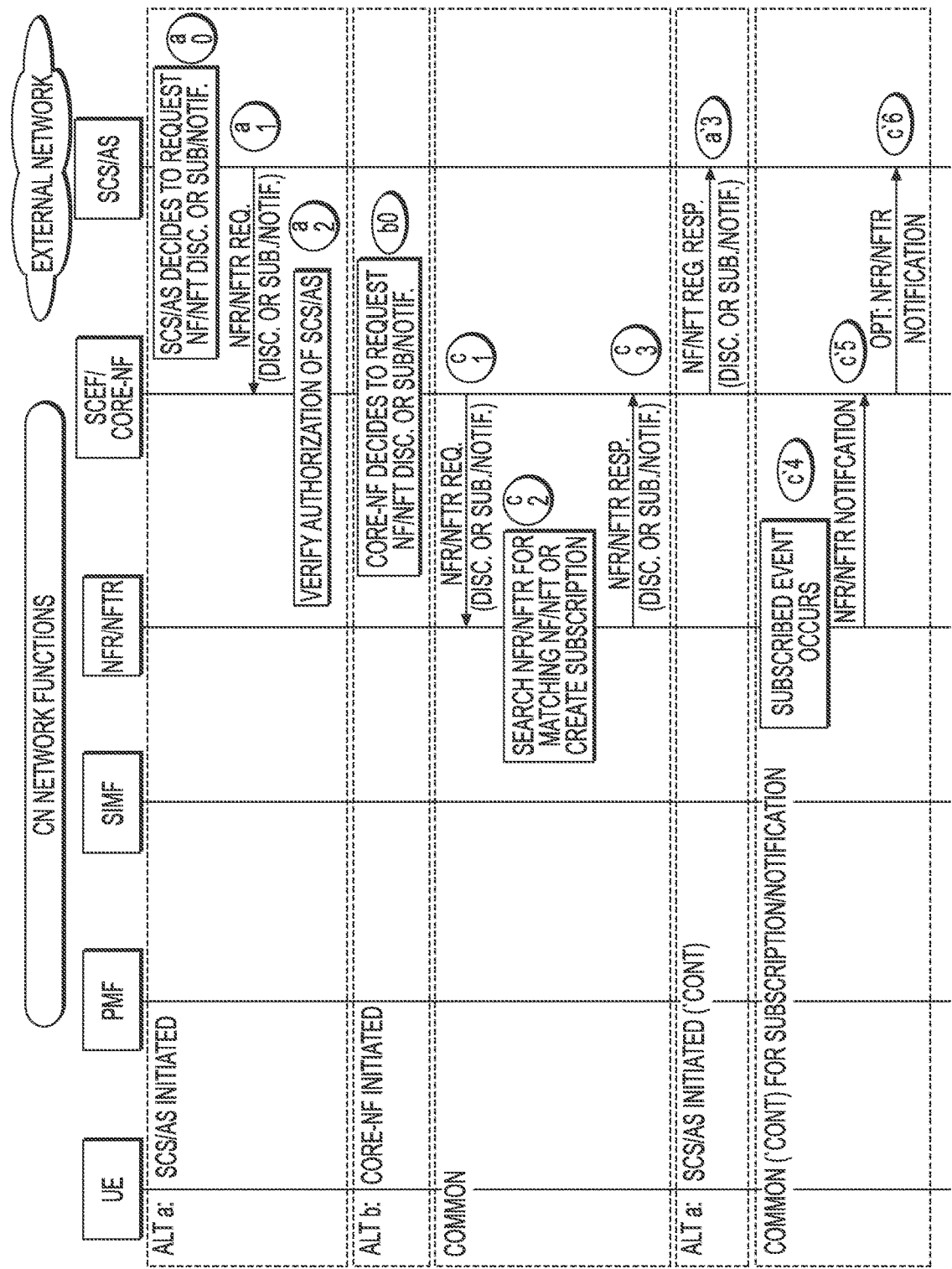
FIG. 12 illustrates a NF or network function template (NFT) discovery or subscription/notification flow according to an embodiment of the application.

The APIs are used to allow the originator to be informed of available NFs or NFTs in a slice based on matching criteria. In addition to providing matching criteria, a subscriber may provide descriptions for events to be notified of, e.g., when the status of NF changes. This is exemplarily shown in FIG. 12. The steps are referenced by an alphanumeric designation, e.g., a0, a1, etc. FIG. 12 depicts commonalities and differences in the steps to be executed. The procedures may apply to NFR and NFTR. When the SCS/AS initiates the request, the request is sent to the SCEF who verifies the authority to submit this request. If verified, the request proceeds as a consumer Core-NF. Alternatively, the request may come directly from another consumer Core-NF or from a UE.

FIG. 12 illustrates two embodiments for the initial triggering and set-up phase. Embodiment 'a' describes a SCS/AS initiates discovery or subscription/notification at the NFR or NFTR according to the following steps.

Step a0: The SCS/AS decides to submit a request for discovery or subscription/notification at NF or an NFT. This enables the SCS/AS to obtain information about the functionality instantiated in the slice or available for instantiation.

Step a1: The NF/NFT Discovery/Subscription Request is sent to the SCEF. It includes match parameters to be used as search criteria or to trigger a notification event.

Step a2: SCEF verifies that the SCS/AS is authorized to make such a request (accessing other MCN nodes as needed).

On the other hand, embodiment 'b' describes a Core-NF entity initiating discovery or subscription/notification at the NFR or NFTR according to the following steps.

Step b0: Core-NF internal processing results in a decision to submit a request for discovery or subscription/notification at NF or an NFT. This enables the Core-NF to obtain information about the functionality instantiated in the slice or available for instantiation.

Subsequent to the above-mentioned embodiments in FIG. 12, the following steps are considered common to both and denoted as 'c'. During this time, the SCEF's role is similar to that of any other Core-NF which might initiate the procedure. According to step c1, the SCEF/Core-NF forwards the request to the NFR/NFTR. It is envisaged that the request may be forwarded by another entity, such as for example the SIMF. The request message may include the following parameters which have been received by the SCEF from the SCS/AS or have been generated by the Core-NF, and which represent Inputs for the procedure:

Requester Credentials: Enable authorization and authentication, as well as signatures for the NSD/VNFD.

Template Description or a reference to a Template Description in the NFTR, the description as presented in Table 3.

NFT Pool: Represents a specific NFT Pool to perform the discovery in, or to be subscribed to. NFT Pools are logical groupings of templates and may be specified as a part of the Matching Parameters or separately for limiting the search target, for access control purposes, etc.

Criteria: Includes of series of parameters to be matched for discovery or for generating the notification, e.g. NF or NFT characteristics. The criteria may also indicate: physical location (where the NF is or NFT is constrained to be instantiated), state or slice information, etc.

Return Format: Indicates what information should be included in a discovery response (e.g. do not return software image) and with that format (e.g. IDs only, full description, etc.) This enables the discovery request to format the response and to be usable for querying for specific information only.

Notification Events: Describes events to generate notifications for (applicable for subscription/notification only), e.g. NFT update, NF started/stopped, etc.

Callback Reference ID. When the subscribed event occurs, this value is provided to the subscriber so that the subscriber can correlate the event to the request.

Subsequent to step c1, discovery for the matching criteria provided in the request is used for searching within the NFR/NFTR (step c2). For subscription/notification, the request information is used for creating the subscription based on matching the given criteria or the given events being triggered. Next, the NFR/NFTR sends the registration response to the SCEF/Core-NF and includes outputs of the discovery/subscription procedure including but not limited to: (i) Success or Failure indicators; (ii) NF Instance Identifier(s): NF Instance Identifiers (e.g. NF-RedId) that match the discovery criteria; and (iii) NFT Instance Identifier(s): NFT Identifiers (e.g. NFT-RegId) that match the discovery criteria (step c3).

In a further embodiment of embodiment 'a', if the request is originated with an SCA/AS, the SCEF forwards the response and outputs to the originator (step a'3)

NF Instantiation Request API

Figure 13:
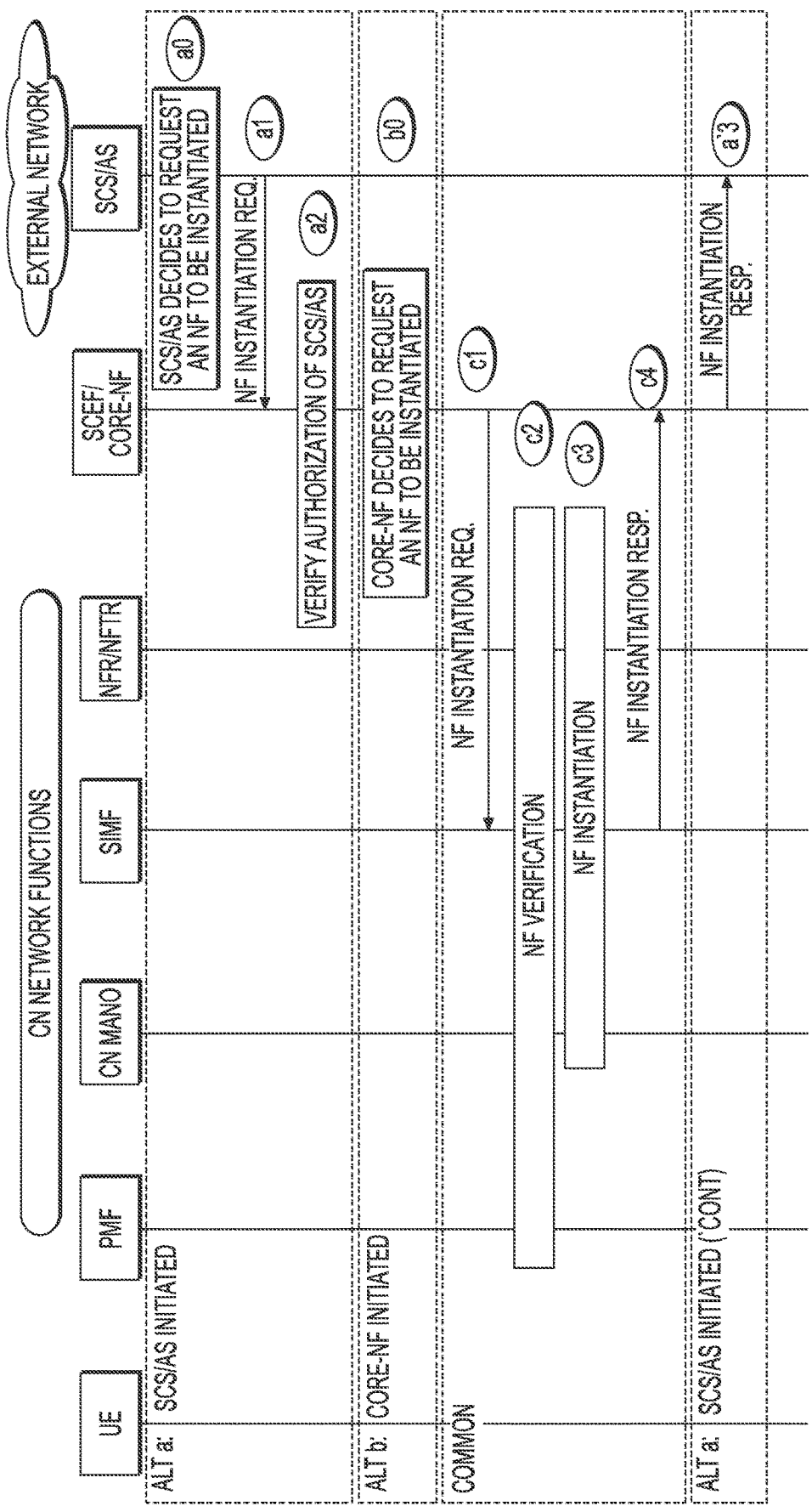
FIG. 13 illustrates a NF instantiation flow according to an embodiment of the application.

According to even another aspect of the application, NF instantiation procedures and architecture are described. NF instantiation provides the ability to instantiate, i.e., spawn, NFs and expose this functionality to entities such as a SCS/AS. In one embodiment 'a' as shown in FIG. 13, the request for NF instantiation is initiated by a SCS/AS and sent to the SCEF (steps a0-2. In an alternative embodiment, 'b,' NF instantiation is performed by a Core-NF (step b0). Each of the steps is denoted by an alpha-numeric designation, e.g., a0, a1, etc. Subsequent to the above-mentioned steps in FIG. 13, the following steps are considered common to both embodiments 'a' and 'b'.

According to step c1, the SCEF/Core-NF forwards the registration request to the NFR/NFTR. It is envisaged that in different implementations, this request may be forwarded via other entities e.g., SIMF. The registration request message may include one or more of the following parameters which have been received by the SCEF from the SCS/AS or have been generated by the Core-NF. These parameters represent inputs for the procedure and including the following:

Requester Credentials: Enable authorization and authentication, as well as signatures for the NSD/VNFD Requester Access Control Info: If the requester is allowed to instantiate the NF with multiple roles (e.g., admin, userX, etc.) it indicates the role under which this specific instantiation is created.

Template Description (or a reference to a Template Description): The reference may be provided using NF-RegId or NFT-RedId of registered NF/NFTs.

Instance Location: Identifies preferred location for instantiation. The Instance Location may be generic (e.g., CN0, specific slice ID(s)), or specific, e.g., physical location).

NF Pool: Indicator for an NF Pool this instance is part of. NF Pools are logical groupings of instances, e.g., NFs in the same NF pool may be interchangeably used for load balancing purposes.

Functional Descriptor: Indicates the type of function to be provided by the requested NF (e.g. Caching, Parental control, etc.). May be used for example if several NFs may be instantiated for the purpose, leaving further selection decisions to the MCN.

Network Service Flavor Descriptor: Indicates NFV flavor, e.g., number of instances of each constituent VNF, "affinity" rules about keeping the VMs and hosts together, etc.

Instance Policy Constraints: If multiple policies are allowed in the template, indicates which policies should be used for this instance. For example if the template allows a large max number of instances, this request may limit the current instantiation to be scaled up to a lower number of maximum instances.

Instance Charging Info: If different types of charging are allowed by the "Instantiation Charging Info" in the template, this attribute indicates which should be employed in this instance, e.g. charge only per UE, per resources used, per NF instance, etc. The NF instance then generates (or provides configurations for) the pertinent charging events; the charging records are forwarded to the CN for accounting and billing purposes.

Instance SFC info: Provides chaining information, e.g. recommended or mandatory chaining via a list of applicable service function chains, including their structure.

Instance Serviced Entities: Indicates constraints related to the entities allowed to use this service. For example, it might contain a list of UEs for which the NF should be instantiated or a list of other SCS/AS that may be allowed to use this instantiation.

Instance Service Constraints: Indicates constraints to be used when determining the instantiation level. For example, it might contain acceptable latency information which may be used by MCN to determine unspecified resource levels Instantiation Workflow: indicates rules to be used for instantiating this NF e.g. based on future slice conditions, based on relocation of serviced UEs, etc. For example, it may provide parameters for moving a caching service to a certain area close to the UE, as the UE moves, without needing action from the SCS/AS. In other examples may indicate periodic scaling of resources automatically, without SCS/AS involvement.

According to step c2, the NF to be instantiated undergoes verification using the services of other NFs such as SIMF and PMF. For example, if a NF-RegId is provided, the SIMF verifies that the function is allowed to be instantiated based on current slice status. If the SIMF verifies the existence of a given template and its consistency with the policies and request PMF may validate the request against other existing policies. SIMF may provide current slice instance state information which helps in verification.

According to step c3, the relevant CN entities, e.g., SIMF performs instantiation by invoking the MANO functionality of the MCN slice. If the instantiation was performed based on a template, the registration of this first instance of the template might be performed by SIMF on behalf of the originator if the function is already part of NFR a change of state might be performed instead.

According to step c4, the SIMF sends an instantiation response to SCEF/Core-NF. The response includes outputs of the instantiation procedure such as: (i) Success or Failure indicators; (ii) Actual instantiation parameters the NF was instantiated with, and when the request allows for a range; and (iii) Actual/exact location of NF instantiation.

According to a further embodiment, following step a2, the SCEF forwards the instantiation response and outputs to the originator if the request originated with an SCS/AS (step a'3)

NF Instance Management

Figure 14:
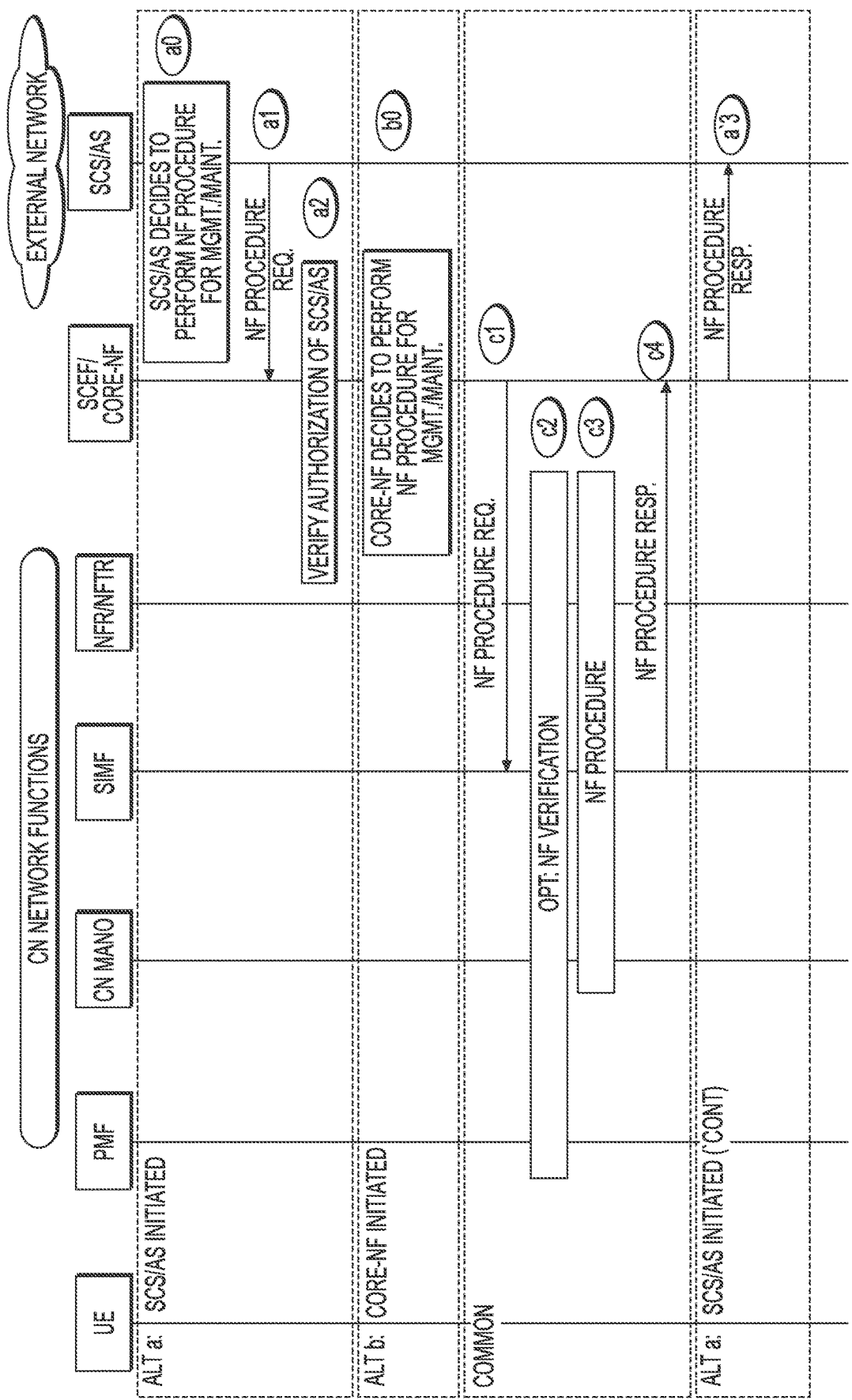
FIG. 14 illustrates a NF instance management common flow according to an embodiment of the application.

In yet a further aspect of the application, an NF instance management exposes the ability to change/manage NF instances instantiated in the MCN. FIG. 14 illustrates a generic flow which may be applied for separate procedures such as Instance Reconfiguration, Termination, Scaling, etc. Separate information pertaining to the individual procedures is provided below. As illustrated, the steps are denoted by an alpha-numeric designation, e.g., a0, a1, etc.

In one embodiment of FIG. 14 'embodiment a', the request for NF instantiation may be initiated by an SCS/AS and sent to the SCEF. In step a0, the SCS/AS decided to perform NF procedure for management or maintenance. Next, the SCS/AS sends a NF procedure request to the Core-NF (step a1). Next, the Core-NF verifies the authorization of SCS/AS (step a2). In an alternative embodiment, the request for NF instantiation may be initiated by the Core-NF (embodiment 'b').

The steps beginning with the letter 'c' are common to the above-mentioned embodiments shown in FIG. 14. Specifically, in step c1, the SCEF/Core-NF forwards the request to the SIMF. It is envisaged that the request may be forwarded via other entities e.g., NFR/NFTR. The request parameters as procedural inputs are detailed below based on procedure type. In step c2, the NF to be managed undergoes verification using the services of other NFs such as SIMF and PMF. This step is optional Next in step c3, the relevant CN entities, e.g. SIMF, performs management by invoking other MCN slice functionality such as MANO. In step c4, the SIMF sends a response to the SCEF/Core-NF, including Outputs of the procedure According to a further embodiment, if the request originated with an SCS/AS, the SCEF forwards the response and outputs to the originator (step a'3).

NF Instance Reconfiguration API

According to even a further aspect of the application, the NF Instance Reconfiguration procedure may be employed for changes to the instance, e.g., location, instantiation flavor, etc., and uses the generic flow shown in FIG. 14. It may also be used to change states as described above in the application. As illustrated, the steps are denoted by an alpha-numeric designation, e.g., a0, a1, etc.

In an embodiment, the reconfiguration request message (steps a1, c1) may include the following input parameters which have been received by the SCEF from the SCS/AS, or alternatively, generated by the Core-NF:

Requester Credentials: Enable authorization and authentication, as well as signatures for the NSD/VNFD.

Instance: A reference may be provided using NF-RedId. A reconfiguration Ref-Id may be provided as well, in which case this is a rollback of an earlier procedure.

Reconfigured Location: Specifies a new location for instantiation.

Reconfigured NF Pool: Specifies a new NF Pool the NF is to become part of

Reconfigured Service Flavor Descriptor: Indicates a new/modified NFV flavor.

Reconfigured Policy Constraints: Indicates new/reconfigured policies to be used for this instance.

Reconfigured Charging Info: Indicates new/reconfigured charging information to be used for the instance.

Reconfigured SFC info: Indicates new/reconfigured chaining information.

Reconfigured Service Constraints: Indicates new/reconfigured constraints related to the entities allowed to use this service.

Backup Configuration: indicates if and which functional information should be retained for possible future rollbacks.

Reconfigured Instantiation Workflow: indicates new/reconfigured rules to be used for instantiating this NF automatically.

Reconfiguration Ref-Id: provides a procedure instance reference to be used for possible rollbacks.

New Configuration Reference(s): provides new reference id(s) for the new configuration, e.g. a new NF-RedId.

In an embodiment, step c3 reflects the actual reconfiguration of the instance by the SIMF using other slice functionality, e.g. MANO.

The reconfiguration response message (steps c4, a'4) may include the following output parameters: (i) Success or Failure indicators; (ii) Actual parameters of the NF instance after procedure, when request allows for a range; (iii) Actual/exact location of NF instantiation; and (iv) New configuration reference returned, especially for rollbacks.

NF Instance Termination Request API

According to yet even another aspect of the application, a NF instance termination procedure may be used to remove an instance from the slice. An exemplary illustration of the generic flow is provided in FIG. 14. As illustrated, the steps are denoted by an alpha-numeric designation, e.g., a0, a1, etc.

In an embodiment, the termination request message (steps a1, c1) may include the following input parameters which have been received by the SCEF from the SCS/AS (or have been generated by the Core-NF):

Requester Credentials: Enable authorization and authentication, as well as signatures for the NSD/VNFD.

Instance: A reference may be provided using NF-RegId.

Location: Identifies location of function to be terminated, to be used together with other identifiers, e.g., NF type. Location might be specified in generic way (e.g. CN, slice ID), or as physical location, etc.

NF type: Specifies a type of function to be terminated.

NF Pool: The request may indicate that any of the instances in this pool may be terminated, instead of providing specific function identifiers or descriptors.

Termination Workflow: Indicates rules to be used for terminating NFs automatically.

In an embodiment, step c3 reflects the actual termination of the instance by the SIMF using other slice functionality, e.g., MANO. Depending on implementation, it may involve a change of state in the NFR or deregistration of the NF from the NFR.

In another embodiment, the termination response message (steps c4, a'4) may include the following output parameters: (i) Success or failure indicators.

NF Instance Scaling Request API

According to even another aspect of the application, a NF Instance Scaling procedure may be used for scaling an instance from the slice. An exemplary illustration based on the generic flow is presented in FIG. 14. As illustrated, the steps are denoted by an alpha-numeric designation, e.g., a0, a1, etc.

The scaling operation may be similar to the reconfiguration, in the sense that different instantiation parameters will be used. However the scaling request may result in a change of resource allocation in the system or in more/fewer component NFs to be instantiated.

The instance scaling request message (steps a1, c1) may include the following input parameters which have been received by the SCEF from the SCS/AS (or have been generated by the Core-NF):

Requester Credentials: Enable authorization and authentication, as well as signatures for the NSD/VNFD.

Scaled Instance: A reference may be provided e.g. using NF-RegId.

Location: Identifies location of function to be scaled, to be used together with other identifiers, e.g., NF type. Location might be specified in generic way (e.g., CN, slice ID), or as physical location, etc.

NF type: Specifies a type of function to be scaled, e.g., Core.

NF Pool: The request may indicate that any of the instances in this pool may be scaled up/down, instead of providing a specific function.

New Scaling Parameters: Parameters indicating the new scaling level, e.g., NsScalingAspect, NsInstantiationLevel, VnfToLevelMapping, NsToLevelMapping.

Scaling Workflow: Indicates rules to be used for scaling NFs automatically.

In another embodiment, step c3 reflects the actual scaling of the instance by the SIMF using other slice functionality, e.g., MANO. Depending on implementation, it may involve changes in the NFR.

In yet another embodiment of this aspect, the instance scaling response message (steps c4, a'4) may include the following output parameters: (i) Success or failure indicators; (ii) Actual scaling parameters: information about the level of scaling achieved; (iii) Additional scaling info: if scaling results in additional component NFs to be created, ids and related information may be provided to the requester.

NF Instance State Change API

According to a further aspect of the application, the NF Instance State Change API may be used for changing NF states. An exemplary illustration of the aspect along with the generic flow is shown in FIG. 14.

In an embodiment, the NF instance state change request message (steps a1, c1) may include the following Input parameters which have been received by the SCEF from the SCS/AS (or have been generated by the Core-NF):

Requester Credentials: Enable authorization and authentication, as well as signatures for the NSD/VNFD.

Instance: A reference may be provided e.g. using NF-RegId.

Location: Identifies location of function to be started/stopped/reset, to be used together with other identifiers, e.g.

NF type. Location might be specified in generic way (e.g. CN, slice ID), or as physical location, etc.

NF type: Specifies a type of function to be started/stopped/reset, e.g., Core.

NF Pool: The request may indicate that any of the instances in this pool may be started/stopped/reset, instead of providing a specific function.

State Change Workflow: Indicates rules to be used for changing states automatically In another embodiment, step c3 reflects the actual state change of the instance by the SIMF using other slice functionality, e.g., MANO. Depending on implementation, it may involve changes in the NFR.

The instance state change response message (steps c4, a'4) may include the following output parameters: (i) Success or failure indicators.

Exposure API at the UE

According to even a further aspect of the application, the information needed to determine how to best scale, configure, or instantiate network functions may be available at the UE is described. The information enables network functionality to be instantiated based on service requirements at the UE, e.g., when a download requires a virus scan NF. In addition to UE service requirements, UE states and actions may be most relevant for triggering procedures such as those described above.

Figure 15:
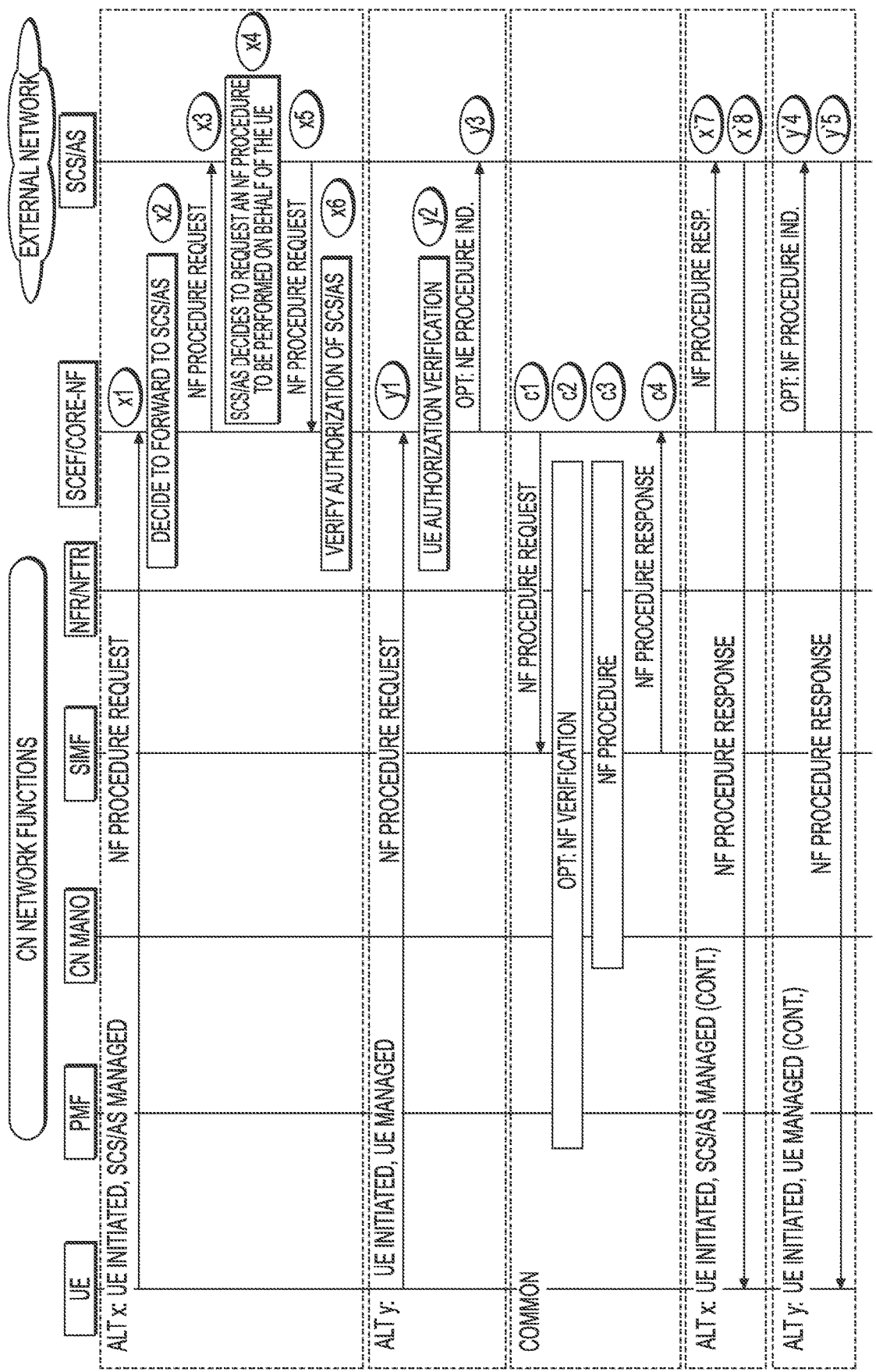
FIG. 15 illustrates an exposure API at the UE according to an embodiment of the application.

In an embodiment, the service instantiation methods may be exposed to UE using the same SCEF entity or by a separate, dedicated, service exposure entity for UEs. It is envisaged that the same SCEF exposure entity be used. FIG. 15 illustrates an exemplary embodiment where the above-mentioned embodiments are shown in more detail. As illustrated, the steps are denoted by an alpha-numeric designation, e.g., a0, a1, etc.

In one embodiment, the UE initiates and the SCS/AS is managed. This is shown as 'Alt x' in FIG. 15. In this embodiment, the UE initiates a procedure by sending a request to the SCEF, which gets forwarded to the SCS/AS. The SCS/AS acts on the UE's behalf by calling instantiation APIs introduced earlier. The SCS/AS may also act on the UE's behalf based on a direct request from the UE on either data or user plane.

According to step x1, the NF Procedure Request is sent by the UE to the SCEF. It is envisaged that the "NF Procedure" message is abstracted and may be instantiated as any of the messages introduced in this application. The request may be for:

NF/NFT Registration
NF/NFT Discovery
NF/NFT Subscription/Notification
NF Instantiation
NF Instance Reconfiguration
NF Instance Termination
NF Instance Scaling
NF Instance State Change In addition to the respective request parameters introduced above in this application, the request from the UE may include:

UE Credentials: Enable authorization and authentication, as well as signatures for the requested NF.

Delegation flag: The UE may indicate itself it wants the procedure to be delegated to an SCS/AS (alternative x) or to self-manage it (alternative y), or the decision may be subject to implementation and local SCEF policies.

Related SCS/AS: If several choices of SCS/AS are possible, the UE may indicate which SCS/AS should be used. The choice may be indicated with an SCS identifier, or by providing characteristics (e.g., "SCS/AS for multimedia applications")

The NF Procedure Request may also allow for a request based on abstracted NF/NFT descriptions as described above. The UE makes an abstract request for caching, which then gets translated into an instantiation request for a specific NF based on other criteria such as UE location, etc.

According to step x2, SCEF determines the pertinent SCS/AS to forward the request to. The decision to forward may be based on local policies or on the content of the request message, i.e. the UE may request specifically that the SCS/AS manages the procedure. The choice of SCS/AS may also be made by the UE or by the SCEF based on received information and local policies.

According to step x3, the SCEF forwards the request to the SCS/AS. It is envisaged in this application that steps x1, x2 and x3 may be realized also by the UE sending a direct request to the SCS/AS. This may be done using either the control or user plane. It is also envisaged according to this application that the UE to SCS/AS request may be abstracted (e.g., "request for caching") or detailed (e.g., "request for instantiating NF-RegId 123").

According to step x4, the SCS/AS decides to request an NF procedure to be performed on behalf of the UE.

According to step x5, the SCS/AS uses information provided in the initial request, as well as locally available information, to provide the information required in the NF Procedure Request message, and it sends it to the SCEF. For example, if the UE request includes only an acceptable delay, the SCS/AS might be able to compute a specific location to request for NF instantiation.

According to step x6, the SCEF verifies that the SCS/AS is authorized to make such a request (accessing other MCN nodes as needed). It is envisaged, that the authorization may be performed using SCS/AS credentials, UE credentials, or both.

In an alternative embodiment the UE initiates and the UE is managed. This is shown as 'Alt y' in FIG. 15. In this embodiment, the UE initiates a procedure by sending a request to the SCEF. After authorization, the service instantiation procedure is performed within the MCN and the UE receives a response to its request. The SCS/AS may be informed of the procedure instantiation and/or completion.

According to step y1, the NF Procedure Request is sent by the UE to the SCEF. As in step x1, the "NF Procedure" message shown is abstracted and may be instantiated as any of the messages introduced above and may contain any of the additional parameters indicated above.

According to step y2, the SCEF verifies that the UE is authorized to make such a request (accessing other MCN nodes as needed). In step y3 (optional), the SCEF informs relevant SCS/AS(s) (e.g., those included in related SCS/AS parameter, or those allowed access in instance serviced entities constraints for an instantiation request) about the triggering of the procedure.

As shown in FIG. 15, the common phase identified by the designation beginning with 'c', is common to the embodiments discussed above. The overall functionality is included in the propagation of the request within the MCN slice, the execution service instantiation procedure, and the receipt of a corresponding response by the SCEF.

It is proposed in another embodiment that after the SCEF receives the procedure response (alt x), the SCEF forwards the procedure response to it (step x'7). Local processing might ensue, e.g., the SCS/AS might make changes to the services offered to the UE based on the NF procedure performed. Next, the SCS/AS forwards the procedure response to the originating UE, indicating all or some of the received response information (step x'8).

It is also proposed in yet another embodiment with respect to 'alt y,' the SCEF provides an indication to relevant SCS/AS(s) that the procedure has been completed (y'4). Local processing might ensue, e.g. the SCS/AS(s) might make changes to the services offered to the UE based on the NF procedure performed. Moreover, the SCEF may forward the procedure response to the originating UE, indicating all or some of the received response information (y'5). Depending on the implementation, the system may allow either one or both options. The decision in step x2 to forward the request may be based either on UE request, local SCEF policy or both.

According to yet even a further aspect of the application, graphical user interfaces (GUIs) supporting functionality described above is described. The GUI may be implemented at the core network, the 3rd party application server (SCS/AS) or the UE. The GUI is described in FIGS. 8C and 8D and further illustrated in FIG. 16. FIG. 16 shows an exemplary deployment with four GUIs—610, 615, 620, and 630. The underlined text refers to parameters belonging to an NFT created by the MCN GUI in 'A.' (GUI 610). The italicized text refers to parameters provided with requests for NF procedures 'B' (GUI 615). Other italicized text refers to instantiation parameters provided by the SCS/AS.

Within the core network, a GUI may be implemented to provide direct access to the NFTR and to introduce new templates in the system. The GUI may be used to perform one or more functions. One function may include providing the system with complete/deployable NFTs. This may either be for single functions or services instantiating one or more functions. This is designated by an 'A' of 1610 in regards to the core network. Another function may include providing the system with abstracted NFTs by allowing parameter inputs which are to be translated internally to NFT formats. Yet another function may include displaying existing/available NFTs in the system. A further function may include querying for specific NFTs in the system.

According to another embodiment as shown in FIG. 16, another core network GUI may be implemented for the core network to allow instantiation and management of NFs in the system. The GUI may be used to perform one or more functions. One function may include providing the system with configurations (deployable or abstracted) for specific NF instantiations or procedures. This is designated as 'B' in relation to the GUI 1615 for the Core Network. Another function may include providing the system with the trigger to start a NF procedure. This is also shown by 'B.' Yet another function may including providing the system with a workflow for automatically instantiating NF procedures based on changing states and parameters. A further function may include displaying existing/available NFs in the system, monitor them and/or related events. Yet a further function may include querying for specific NFTs in the system According to even another embodiment as shown in FIG. 16, a third party application server (SCS/AS) may be provided with GUI(s) 1620 'C' which may be used to perform one or more functions. As shown by the italicized text, a scaling request is performed. The scaling parameter is indicated in quotes, e.g., 150%. This will be translated in the NsScalingAspect parameter in italics provided for execution during the procedure. One function may include providing the system with complete/deployable or abstracted NFTs. Another function may include providing the system with configurations (deployable or abstracted) for specific NF instantiations or procedures. Another function may include providing the system with triggers to request NF procedures. Yet another function may include providing the system with a workflow for automatically triggered NF procedures based on changing states and parameters. Yet even another function may include querying the system for existing/available NFs, monitor them and/or related events. A further function may include displaying notifications of related events.

In yet a further embodiment in view of FIG. 16 describes a UE provided with GUI(s) 1630 'D' which may be used to perform one or more functions. In GUI 1630, service constraint parameters, e.g., "SMS delay," will be translated by the system for execution. One function may include providing the system with complete/deployable or abstracted NFTs. Another function may include providing the system with configurations (deployable or abstracted) for specific NF instantiations or procedures. Yet another function may include provide the system with triggers to request NF procedures. Yet even another function may include providing the system with a workflow for automatically triggered NF procedures based on changing states and parameters. A further function may include querying the system for existing/available NFs, monitor them and/or related events. Yet even a further function may include displaying notifications of related events.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, transit device or the like, perform and/or implement the systems, methods and processes described herein. Specifically, any of the steps, operations or functions described above may be implemented in the form of such computer executable instructions. Computer readable storage media includes volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, a non-transitory computer-readable or executable storage medium for storing computer-readable or executable instructions is disclosed. The medium may include one or more computer-executable instructions such as disclosed above in the plural call flows according to FIGS. 11-15. The computer executable instructions may be stored in a memory and executed by a processor as disclosed above in FIGS. 8C and 8D, and employed in devices including UEs, SCSs, and ASs.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A core network comprising:
   a non-transitory memory having instructions stored thereon for registering a network function or network function template to the core network; and
   a processor, operably coupled to the non-transitory memory, configured to perform the instructions of:
   receiving a request to register the network function or network function template, wherein the request includes location preferences;
   determining that registration of the network function or network function template is acceptable;
   transmitting a message including the network function or network function template, the location preferences, and a requestor credential to a repository in the core network;
   verifying the network function or network function template against existing policies in the core network;
   assigning a registry identifier to the network function or network function template;
   registering, subsequent to the verifying and assigning instructions, the network function or network function template in the repository; and
   providing a registration response including the assigned registry identifier.

2. The core network of claim 1, wherein the determining instruction includes
   receiving a registration request for the network function or network function template from a node outside the core network, and
   verifying an identify of the node.

3. The core network of claim 2, wherein the processor is further configured to perform the instruction of sending a response, based upon the registering instruction, to a networking function in the core network or to the node.

4. The core network of claim 1, wherein the registering instruction includes adding the network function or network function template to the repository.

5. The core network of claim 1, wherein the message further includes a template description.

6. A core network comprising:
   a non-transitory memory having instructions stored thereon for discovering a network function or network function template in the core network; and
   a processor, operably coupled to the non-transitory memory, configured to perform the instructions of:
   determining that discovery of the network function or network function template is acceptable;
   transmitting a message including discovery criteria, and a requestor credential to a repository in the core network, where the criteria includes location or slice information;
   determining, based on the criteria, a registry identifier for the network function or network function template is acceptable;
   searching for a network function identifier or network function template identifier in the repository;
   discovering the network function or network function template in the repository; and
   sending a discovery response based upon the discovering instruction to a networking function in the core network.

7. The core network of claim 6, wherein the determining instruction includes receiving a request to discover the network function or network function template from a node outside of the core network, and verifying an identify of the node.

8. The core network of claim 7, wherein the processor is further configured to perform the instruction of sending the discovery response to the node.

9. The core network of claim 8, wherein the message includes information selected from template description, network function template pool, discovery criteria, return format, notification event, callback reference id and combinations thereof.

10. The core network of claim 7, wherein the processor is further configured to perform the instructions determining that subscription to the discovered network function or network function template is acceptable, and creating a subscription for the discovered network function or the network function template.

11. The core network of claim 10, wherein the processor is further configured to perform the instructions of determining that an event associated with the subscription has occurred, and sending a response to the subscription.

12. A core network comprising:
   a non-transitory memory having instructions stored thereon for instantiating a network function in the core network; and
   a processor, operably coupled to the non-transitory memory, configured to perform the instructions of:
   receiving a message for service instantiation, the message including a functional description of a network function, a preferred location of the service instantiation and a requestor credential;
   determining, based on one or more parameters in the received message, that instantiation of the network function is acceptable;
   determining, based on the received message, a deployable service configuration for the network function;
   transmitting a message including the requestor credential and an instantiation request with the deployable service configuration for the network function and the preferred location of the service instantiation to a slice instance management function in the core network;
   verifying the network function can be instantiated;
   determining instantiation parameters for the network function;
   determining a location for the network function;
   assigning a registry identifier to the network function; and
   instantiating the network function based on parameters in the received message after the verifying and assigning instructions, the instantiation instruction including registration of a first instance of the network function or performing a change of state for an existing network function.

13. The core network of claim 12, wherein the transmitted message further includes information selected from, requester access control information, template description, instance location, network function pool, function descriptor, network service flavor descriptor, instance policy constraints, instance charging information, instance service function chaining information, instance serviced entities, instance service constraints, instantiation workflow and combinations thereof.

14. The core network of claim 12, wherein the processor is further configured to perform the instruction of sending a response to a node outside the core network.

15. The core network of claim 12, wherein the processor is further configured to perform the instruction of reconfiguring the instantiation based upon an observed reconfiguration request.

16. The core network of claim 15, wherein the reconfiguration request includes one or more of workflow, a requestor credential, instance, reconfigured location, reconfigured network function pool, reconfigured service flavor descriptor, reconfigured policy constraints, reconfigured charging information, reconfigured service function chaining information, reconfigured service constraints, backup configuration, reconfigured instantiation workflow, reconfiguration reference identification, and new configuration references.

17. The core network of claim 15, wherein the reconfiguring instruction includes a scaling request for resource allocation.

18. The core network of claim 12, wherein the processor is further configured to perform the instruction of terminating the instantiation based upon an observed termination request, and sending a termination response including a success or failure indicator.

19. The core network of claim 12, wherein the processor is further configured to perform the instruction of changing a state of a network function based upon an observed request.

* * * * *